US009547878B1

(12) United States Patent
Kerr

(10) Patent No.: US 9,547,878 B1
(45) Date of Patent: Jan. 17, 2017

(54) CENTRAL RESERVATION SYSTEM AVAILABILITY ENGINE

(71) Applicant: Gordon Stewart Kerr, Estero, FL (US)

(72) Inventor: Gordon Stewart Kerr, Estero, FL (US)

( * ) Notice: Subject to any disclaimer, the term of this patent is extended or adjusted under 35 U.S.C. 154(b) by 0 days.

(21) Appl. No.: 13/900,660

(22) Filed: May 23, 2013

Related U.S. Application Data

(60) Provisional application No. 61/800,124, filed on Mar. 15, 2013.

(51) Int. Cl.
G06Q 50/12 (2012.01)
G06Q 10/02 (2012.01)
G06Q 50/14 (2012.01)

(52) U.S. Cl.
CPC .............. G06Q 50/12 (2013.01); G06Q 10/02 (2013.01); G06Q 50/14 (2013.01); Y10S 707/99933 (2013.01)

(58) Field of Classification Search
CPC ........ G06Q 10/02; G06Q 50/14; G02Q 50/12; Y10S 707/99933
See application file for complete search history.

(56) References Cited

U.S. PATENT DOCUMENTS

| | | | |
|---|---|---|---|
| 5,404,291 A | 4/1995 | Kerr et al. | |
| 6,477,503 B1 | 11/2002 | Mankes | |
| 6,839,720 B1 * | 1/2005 | Thibodeau | |
| 7,076,451 B1 | 7/2006 | Coupland et al. | |
| 7,136,821 B1 * | 11/2006 | Kohavi et al. | 705/5 |
| 7,321,863 B2 * | 1/2008 | Hartmann et al. | 705/5 |
| 7,328,166 B1 * | 2/2008 | Geoghegan et al. | 705/5 |
| 7,584,110 B2 | 9/2009 | Robertson | |
| 7,917,387 B2 | 3/2011 | Spurr et al. | |
| 8,099,294 B2 | 1/2012 | Marode et al. | |
| 8,285,565 B2 | 10/2012 | Kerr et al. | |
| 8,311,855 B2 | 11/2012 | Kerr et al. | |
| 2002/0173996 A1 | 11/2002 | Murch et al. | |

(Continued)

OTHER PUBLICATIONS

Delio, Michelle. "14 Hidden Hotel Fees to Avoid". <http://www.fodors.com/news/story_2921.html> (<http://web.archive.org/web/20110829075328/http://www.fodors.com/news/story_2921.html> on Aug. 29, 2011).*

(Continued)

Primary Examiner — Brian Tallman
(74) Attorney, Agent, or Firm — The Law Office of Patrick F. O'Reilly, III, LLC

(57) ABSTRACT

The system and method of the invention describes a unique and simplified design for Hotel Central Reservations Systems that reduces cost and response time by factors of 2 to 10 times. The system accepts ARI information from Property Management Systems and services availability requests from external sources such as Global Distribution Systems or Online Travel Agencies, and proprietary web sites or call centers. The system provides for complete generality with respect to room types and rate management by hotel and by day, for an arbitrary number of room types and for an arbitrary number of days in the future, for specific rates for each room type, each day. The system of the invention can be implemented as a web service, a service appliance, or as a separate software product that would integrate with an existing HCRS. The system could also be used by rental car or airline CRSs.

26 Claims, 16 Drawing Sheets

(56) References Cited

U.S. PATENT DOCUMENTS

| | | | | |
|---|---|---|---|---|
| 2007/0067193 | A1* | 3/2007 | Robertson | 705/5 |
| 2007/0075136 | A1* | 4/2007 | Jacob | 235/383 |
| 2007/0226020 | A1* | 9/2007 | Park | 705/5 |
| 2007/0233528 | A1* | 10/2007 | Jafri et al. | 705/5 |
| 2008/0091480 | A1* | 4/2008 | Geoghegan et al. | 705/5 |
| 2008/0262878 | A1* | 10/2008 | Webby et al. | 705/5 |
| 2008/0319945 | A1* | 12/2008 | Heyraud et al. | 707/3 |
| 2010/0114615 | A1 | 5/2010 | Ganguly et al. | |
| 2010/0268727 | A1* | 10/2010 | Fay et al. | 707/769 |
| 2010/0299318 | A1* | 11/2010 | Dufresne et al. | 707/706 |
| 2011/0054957 | A1* | 3/2011 | Drefs et al. | 705/5 |
| 2012/0016698 | A1 | 1/2012 | Gilmore et al. | |
| 2012/0053968 | A1* | 3/2012 | Debarge et al. | 705/5 |
| 2013/0013351 | A1* | 1/2013 | Cholak et al. | 705/5 |

OTHER PUBLICATIONS

Couples Resort webpage <http://www.couples.com/all-inclusive.php> (<http://web.archive.org/web/20110427083417/http://www.couples.com/all-inclusive.php> on Apr. 27, 2011).*

Travelocity Connect Webpages (1 of 7). "Welcome to the Travelocity Connect Developers Portal" <http://connect.travelocity.com/> (<http://web.archive.org/web/20120324153613/http://connect.travelocity.com/> on Mar. 24, 2012).*

Travelocity Connect Webpages (2 of 7). "How Travelocity Connect Works" <http://connect.travelocity.com/page/hotel/How_Travelocity_Connect_Works> (<http://web.archive.org/web/20120519110201/http://connect.travelocity.com/page/hotel/How_Travelocity_Connect_Works> on May 19, 2012).*

Travelocity Connect Webpages (3 of 7). "Documentation Overview" <http://connect.travelocity.com/docs/home> (<http://web.archive.org/web/20120304013515/http://connect.travelocity.com/docs/home> on Mar. 4, 2012).*

Travelocity Connect Webpages (4 of 7). "Best Practices" <http://connect.travelocity.com/page/hotel/Ways_to_increase_revenue_on_Travelocity> (<http://web.archive.org/web/20120519110211/http://connect.travelocity.com/page/hotel/Ways_to_increase_revenue_on_Travelocity> on May 19, 2012).*

Travelocity Connect Webpages (5 of 7). "Frequently Asked Questions" <http://connect.travelocity.com/page/hotel/FAQ> (<http://web.archive.org/web/20120519110156/http://connect.travelocity.com/page/hotel/FAQ> on May 19, 2012).*

Travelocity Connect Webpages (6 of 7). "Hotel Direct Update API" <http://connect.travelocity.com/docs/read/Hotel_Direct_Update_API> (<http://web.archive.org/web/20120304013520/http://connect.travelocity.com/docs/read/Hotel_Direct_Update_API> on Mar. 4, 2012).*

Travelocity Connect Webpages (7 of 7). "Getting Started" <http://connect.travelocity.com/page/hotel/Getting_Started> (<http://web.archive.org/web/20120524150745/http://connect.travelocity.com/page/hotel/Getting_Started> on May 24, 2012).*

* cited by examiner

| Transaction management service to accept availability requests from web sources ||
|---|---|
| Decode routine to translate XML message into internal format (see FIG. 4) ||
| Data reduction routine to compile the specific information needed to respond to the availability request, including room type and rate group availability for the requested dates, and the rate plans available starting with the date of arrival | Availability checking routine to analyze each product or room type and rate plan combination to determine of the request parameters meet the rate plan requirements, and the room type and rate plan are available for the requested number of rooms |
| Rate calculation routine to calculate the total rate for the product based on request parameters and rate plan modifiers (e.g. room type premiums, number of adults, number of rooms etc.). | Rate summary routine for Area Availability to determine the minimum and maximum rate and corresponding room type for each hotel in the area |
| Rate detail routine for Hotel Availability to compile the complete set of products and rates available for the hotel that correspond to the request parameters ||
| Encode routine to compile the product information into the OTA XML format ||
| Transaction action routine to return the completed response to the requesting channel ||

FIG. 7

```xml
<?xml version="1.0" ?>
<OTA_HotelAvailRQ>
 <AvailRequestSegments>
  <AvailRequestSegment>
   <StayDateRange End="2013-05-15" Start="2013-05-08"/>
   <RatePlanCandidates>
    <RatePlanCandidate RatePlanType="13"/>
   </RatePlanCandidates>
   <Profiles>
    <ProfileInfo>
     <Customer>
      <CustLoyalty MembershipID="" ProgramID="FrequentGuest"/>
     </Customer>
    </ProfileInfo>
   </Profiles>
   <RoomStayCandidate Quantity="1" RoomTypeCode="KING">
    <GuestCounts IsPerRoom="true">
     <GuestCount AgeQualifyingCode="10" Count="2"/>
     <GuestCount AgeQualifyingCode="8" Count="1"/>
    </GuestCounts>
   </RoomStayCandidate>
   <HotelSearchCriteria>
    <Criterion>
     <HotelRef ChainCode="HZ" HotelCode="HZ085"/>
     <HotelRef ChainCode="HZ" HotelCode="HZ088"/>
     <HotelRef ChainCode="HZ" HotelCode="HZ522"/>
     <HotelRef ChainCode="HZ" HotelCode="HZ147"/>
     <HotelRef ChainCode="HZ" HotelCode="HZ399"/>
     <HotelRef ChainCode="HZ" HotelCode="HZ374"/>
     <HotelRef ChainCode="HZ" HotelCode="HZ216"/>
     <HotelRef ChainCode="HZ" HotelCode="HZ305"/>
     <HotelRef ChainCode="HZ" HotelCode="HZ348"/>
     <HotelRef ChainCode="HZ" HotelCode="HZ004"/>
              .            .    .
              .            .    .
              .            .    .
     <HotelRef ChainCode="HZ" HotelCode="HZ347"/>
    </Criterion>
   </HotelSearchCriteria>
  </AvailRequestSegment>
 </AvailRequestSegments>
</OTA_HotelAvailRQ>
```

FIG. 8

```xml
<?xml version="1.0" ?>
<OTA_AreaAvailRS>
 <Success/>
 <RoomStays>
  <RoomStay>
   <RoomRates EffectiveDate="2013-05-08" ExpireDate="2013-05-15" RatePlanCode="VACATION_PLAN1" RoomTypeCode="DDBL">
    <RoomRate>
     <Rates>
      <Rate>
       <Base AmountBeforeTax="223.00" CurrencyCode="USD">
        <RateDescription>
         <Text>Minimum</Text>
        </RateDescription>
       </Base>
      </Rate>
      <Rate>
       <Base AmountBeforeTax="393.30" CurrencyCode="USD">
        <RateDescription>
         <Text>Maximum</Text>
        </RateDescription>
       </Base>
      </Rate>
     </Rates>
    </RoomRate>
   </RoomRates>
   <BasicPropertyInfo ChainCode="HZ" HotelCode="HZ085"/>
  </RoomStay>
```

```
<RoomStay>
   <RoomRates EffectiveDate="2013-05-08" ExpireDate="2013-05-15"
RatePlanCode="VACATION_PLAN1" RoomTypeCode="DDBL">
     <RoomRate>
      <Rates>
       <Rate>
        <Base AmountBeforeTax="223.00" CurrencyCode="USD">
         <RateDescription>
          <Text>Minimum</Text>
         </RateDescription>
        </Base>
       </Rate>
       <Rate>
        <Base AmountBeforeTax="393.30" CurrencyCode="USD">
         <RateDescription>
          <Text>Maximum</Text>
         </RateDescription>
        </Base>
       </Rate>
      </Rates>
     </RoomRate>
    </RoomRates>
    <BasicPropertyInfo ChainCode="HZ" HotelCode="HZ088"/>
  </RoomStay>
```

```
<RoomStay>
   <RoomRates EffectiveDate="2013-05-08" ExpireDate="2013-05-15"
RatePlanCode="VACATION_PLAN1" RoomTypeCode="DDBL">
     <RoomRate>
      <Rates>
       <Rate>
        <Base AmountBeforeTax="267.00" CurrencyCode="USD">
         <RateDescription>
          <Text>Minimum</Text>
         </RateDescription>
        </Base>
       </Rate>
       <Rate>
        <Base AmountBeforeTax="441.70" CurrencyCode="USD">
         <RateDescription>
          <Text>Maximum</Text>
         </RateDescription>
        </Base>
       </Rate>
      </Rates>
     </RoomRate>
    </RoomRates>
    <BasicPropertyInfo ChainCode="HZ" HotelCode="HZ522"/>
   </RoomStay>
   <RoomStay>
```

...remaining <RoomStay> details for additional hotels in area deleted

FIG. 9C

```xml
<?xml version="1.0" ?>
<OTA_HotelAvailRQ>
 <AvailRequestSegments>
  <AvailRequestSegment>
   <StayDateRange End="2013-05-15" Start="2013-05-08"/>
   <RatePlanCandidates>
    <RatePlanCandidate RatePlanType="13"/>
   </RatePlanCandidates>
   <Profiles>
    <ProfileInfo>
     <Customer>
      <CustLoyalty MembershipID="" ProgramID="FrequentGuest"/>
     </Customer>
    </ProfileInfo>
   </Profiles>
   <RoomStayCandidate Quantity="1" RoomTypeCode="KING">
    <GuestCounts IsPerRoom="true">
     <GuestCount AgeQualifyingCode="10" Count="2"/>
     <GuestCount AgeQualifyingCode="8" Count="1"/>
    </GuestCounts>
   </RoomStayCandidate>
   <HotelSearchCriteria>
    <Criterion>
     <HotelRef ChainCode="HZ" HotelCode="HZ101"/>
    </Criterion>
   </HotelSearchCriteria>
  </AvailRequestSegment>
 </AvailRequestSegments>
</OTA_HotelAvailRQ>
```

FIG. 10

```xml
<?xml version="1.0" ?>
<OTA_HotelAvailRS>
 <Success/>
 <RoomStays>
  <RoomStay>
   <RoomTypes>
    <RoomType ReqdGuaranteeType="GuaranteeReqd" RoomTypeCode="KING">
     <RoomDescription>
      <Text>RACK_PLAN1/KING</Text>
      <Text>Standard Zeta Hotel Room/400 SF/City View</Text>
      <Text>Amenities - Internet</Text>
     </RoomDescription>
    </RoomType>
   </RoomTypes>
   <RatePlans>
    <RatePlan RatePlanCode="RACK_PLAN1" RatePlanType="13"/>
   </RatePlans>
   <RoomRates>
    <RoomRate EffectiveDate="2013-05-08" ExpireDate="2013-05-15" NumberOfUnits="1" RatePlanCode="RACK_PLAN1" RoomTypeCode="KING">
     <Rates>
      <Rate Guaranteedind="true">
       <Base AmountBeforeTax="255.50" CurrencyCode="USD"/>
       <Total AmountAfterTax="1967.35" AmountBeforeTax="1788.50" CurrencyCode="USD"/>
      </Rate>
     </Rates>
    </RoomRate>
   </RoomRates>
   <CancelPenalties>
    <CancelPenalty PolicyCode="48H"/>
   </CancelPenalties>
   <BasicPropertyInfo ChainCode="HZ" HotelCode="HZ101"/>
  </RoomStay>
```

(additional <RoomStay> detail follows)

FIG. 11A

```
<RoomStay>
   <RoomTypes>
    <RoomType ReqdGuaranteeType="GuaranteeReqd"
RoomTypeCode="PARLOR">
      <RoomDescription>
       <Text>RACK_PLAN1/PARLOR</Text>
       <Text>Standard Zeta Hotel Room/400 SF/City View</Text>
       <Text>Amenities - Internet</Text>
      </RoomDescription>
    </RoomType>
   </RoomTypes>
   <RatePlans>
    <RatePlan RatePlanCode="RACK_PLAN1" RatePlanType="13"/>
   </RatePlans>
   <RoomRates>
    <RoomRate EffectiveDate="2013-05-08" ExpireDate="2013-05-15"
NumberOfUnits="1" RatePlanCode="RACK_PLAN1" RoomTypeCode="PARLOR">
     <Rates>
      <Rate Guaranteedind="true">
       <Base AmountBeforeTax="325.50" CurrencyCode="USD"/>
       <Total AmountAfterTax="2506.35" AmountBeforeTax="2278.50"
CurrencyCode="USD"/>
      </Rate>
     </Rates>
    </RoomRate>
   </RoomRates>
   <CancelPenalties>
    <CancelPenalty PolicyCode="48H"/>
   </CancelPenalties>
   <BasicPropertyInfo ChainCode="HZ" HotelCode="HZ101"/>
  </RoomStay>
```

(additional <RoomStay> detail follows)

FIG. 11B

```xml
<RoomStay>
  <RoomTypes>
   <RoomType ReqdGuaranteeType="GuaranteeReqd" RoomTypeCode="ROOM">
    <RoomDescription>
     <Text>RACK_PLAN1/ROOM</Text>
     <Text>Standard Zeta Hotel Room/400 SF/City View</Text>
     <Text>Amenities - Internet</Text>
    </RoomDescription>
   </RoomType>
  </RoomTypes>
  <RatePlans>
   <RatePlan RatePlanCode="RACK_PLAN1" RatePlanType="13"/>
  </RatePlans>
  <RoomRates>
   <RoomRate EffectiveDate="2013-05-08" ExpireDate="2013-05-15" NumberOfUnits="1" RatePlanCode="RACK_PLAN1" RoomTypeCode="ROOM">
    <Rates>
     <Rate Guaranteedind="true">
      <Base AmountBeforeTax="245.50" CurrencyCode="USD"/>
      <Total AmountAfterTax="1890.35" AmountBeforeTax="1718.50" CurrencyCode="USD"/>
     </Rate>
    </Rates>
   </RoomRate>
  </RoomRates>
  <CancelPenalties>
   <CancelPenalty PolicyCode="48H"/>
  </CancelPenalties>
  <BasicPropertyInfo ChainCode="HZ" HotelCode="HZ101"/>
 </RoomStay>
```

(additional <RoomStay> detail follows)

FIG. 11C

```xml
<RoomStay>
  <RoomTypes>
   <RoomType ReqdGuaranteeType="GuaranteeReqd" RoomTypeCode="DDBL">
    <RoomDescription>
     <Text>RACK_PLAN1/DDBL</Text>
     <Text>Standard Zeta Hotel Room/400 SF/City View</Text>
     <Text>Amenities - Internet</Text>
    </RoomDescription>
   </RoomType>
  </RoomTypes>
  <RatePlans>
   <RatePlan RatePlanCode="RACK_PLAN1" RatePlanType="13"/>
  </RatePlans>
  <RoomRates>
   <RoomRate EffectiveDate="2013-05-08" ExpireDate="2013-05-15" NumberOfUnits="1" RatePlanCode="RACK_PLAN1" RoomTypeCode="DDBL">
    <Rates>
     <Rate Guaranteedind="true">
      <Base AmountBeforeTax="275.50" CurrencyCode="USD"/>
      <Total AmountAfterTax="2121.35" AmountBeforeTax="1928.50" CurrencyCode="USD"/>
     </Rate>
    </Rates>
   </RoomRate>
  </RoomRates>
  <CancelPenalties>
   <CancelPenalty PolicyCode="48H"/>
  </CancelPenalties>
  <BasicPropertyInfo ChainCode="HZ" HotelCode="HZ101"/>
 </RoomStay>
```

(additional detail for more than 60 products deleted)

FIG. 11D

CENTRAL RESERVATION SYSTEM AVAILABILITY ENGINE

CROSS-REFERENCE TO RELATED APPLICATIONS

This patent application claims priority to, and incorporates by reference in its entirety, U.S. Provisional Patent Application No. 61/800,124, entitled "Hotel Central Reservation System Availability Engine", filed on Mar. 15, 2013.

STATEMENT REGARDING FEDERALLY SPONSORED RESEARCH OR DEVELOPMENT

Not Applicable.

NAMES OF THE PARTIES TO A JOINT RESEARCH AGREEMENT

Not Applicable.

INCORPORATION BY REFERENCE OF MATERIAL SUBMITTED ON A COMPACT DISK

Not Applicable.

BACKGROUND OF THE INVENTION

1. Field of the Invention

The invention generally relates to an availability engine for a hotel central reservation system (HCRS), a car rental (CRS) central reservation system, and/or an airline (CRS) central reservation system. More particularly, the invention relates to an availability engine that is configured to exchange hotel availability rates and inventory (ARI) messages with the property management systems (PMSs) of hotels. The invention also relates to a method of providing availability information gathered from property management systems (PMSs) and responding to requests for area or hotel availability received from a multitude of internal and external sources.

2. Background

Prospective travelers pose a basic question of hotels and hotel groups: are rooms available and if so at what rate? Multiple variations of this question are posed to hotels and their respective reservation systems through various channels more than a billion times a day. The available room part of the question is a simple yes or no, perhaps enhanced with specific room types that may be available, but the exact or total inventory at a hotel is not needed to answer the question.

The rate question is more complicated since it may depend on the number of guests or special rates requested, and these in turn depend on the way the hotel reservations system represents each individual property. In the past, hotel rates and room types have tended to be standardized in order to respond to the variety of external distribution channels posing availability questions.

Today, however, individual hotels are increasingly managing their rooms and rates as unique to each hotel. This is the direct result of distributed ownership interests in individual hotels, ranging from franchise owners to property management groups that may own many hotels across a number of brands. The design and implementation of current hotel central reservation systems (HCRSs) cannot readily support this change without making large changes to the existing systems and infrastructure.

Hotel chains have long employed central reservations management systems to link individual properties to external sources of demand for hotel rooms. The external sources include individual callers to a chain reservation call center, travel agents connected to airline global distribution systems, and individuals using proprietary chain or online travel websites such as Expedia or Hotels.com.

In the late 1960s, Holiday Inns became the first hotel chain to implement a Hotel Central Reservation System (HCRS) using a version of an existing airline reservation system. Other chains followed suit in the 1970s and 1980s with Marriott, Hyatt, Sheraton and others employing the same basic airline systems technology.

At first, the central systems were used to serve reservation agents in call centers dedicated to each chain. Fax or Teletype messaging updated hotel inventory and rate availability, later replaced with online terminals connecting hotel staff to the central system.

During the 1980s, the major hotel chains began installing Property Management Systems (PMS) in the majority of their properties. They also installed telecommunications networks linking the hotels to the HCRS, allowing for direct, timely and accurate delivery of reservations taken through the HCRS. The HCRSs employed by major chains range in age from 10 years (Hilton) to 20 years (Hyatt) to 30 years (Marriott) to 40 years (Holiday, now part of Intercontinental Hotel Group).

Further refinements to HCRSs in the 1970s and 1980s added direct connections to travel agents through their connections to Airline Reservation Systems, replacing Teletype delivery of reservations. By 1990 most travel agents and agencies had established connections with the airlines as a servicer, which in turn gave the travel agents easy and direct access to hotel information and reservations. For instance, by 1990 the Sabre system from American Airlines had about 30,000 travel agents connected through their system. Sabre was in turn connected directly with most major hotel chains. In addition to Sabre, Apollo (United), WorldSpan (TWA), Amadeus and other Global Distribution Systems (GDS) covered most travel agents around the world.

The HCRSs all provided a common service to external sources through the GDSs: they could respond to requests for information about hotel availability and rates from multiple channels of distribution.

The standardization was needed to provide consistent responses to external sources, ranging from individual callers to chain reservation centers to travel agents connecting through Global Distribution Systems like Sabre (American Airlines), Apollo (United) and many others. This was a compromise, overcome in large part by enforcing standards on individual hotels about the kinds of room types they could offer for sale, and the rates and packages available.

Some workarounds have been implemented that allow individual properties to sell non-standard room types but, in general, requests from external channels for hotel availability of rates and inventory, called ARI as a term of art in the industry, used standard room types and rate terminology. ARI more generally refers to the availability of room types and rate plans, called products. This broader meaning is used herein.

Until the mid 1990s, access to hotel availability was limited to travel agents connected to airline systems like Sabre, or by calling a chain reservation center. Starting in 1996 with the creation of Travelocity, then a part of the Sabre system, a number of online travel agencies (OTAs) began providing individual travellers with direct access to hotel and airline information through the Internet. Today there are dozens of OTAs worldwide, all trying to gain access to and serve the individual traveller. Expedia, Kayak, Travelocity, Hipmunk and many others now compete with travel agents for the commissions that come from booking travel with airlines and hotels.

However, this explosive growth in OTAs has created an equally explosive growth in ARI requests to HCRSs. In the last three years, the number of ARI requests has gone up by 3 to 5 times or more, with minimal growth in the total number of reservations from all sources. A typical HCRS can receive hundreds of requests for availability information for every confirmed booking. Growth in the number of distribution channels is expected to continue, with corresponding growth in the load placed on HCRSs by availability requests.

To respond to this demand, hotel chains have added capacity to their HCRSs, created some shortcut methods, employed newer database technology, and redesigned parts of their system in an attempt to let their existing technology meet the demand. The net effect has been an unbalanced approach that puts extreme demands on systems, software and database technology beyond what was ever considered in original designs.

3. Limitations of Current Hotel Central Reservation Systems

A basic assumption in virtually all HCRS systems is that the central system is the authoritative source for information, not the local property system. The justification for this approach is that the ARI requests come to the HCRS, and bookings are made and confirmed by the HCRS, so the HCRS must have the most up-to-date information in order to answer the ARI request and confirm the booking.

The fundamental HCRS design assumption is that PMSs would not be able to manage communications with multiple external distribution channels, and that it is systematically easier to manage those communications through a central system. A further assumption was that the HCRS therefore needed to be the authoritative source, and moreover had to be the definitive source for ARI. The HCRS has to be authoritative in responding to requests for availability information, but it does not have to manage and control all ARI information, as will be described with regard to invention hereinafter, and it also does not have to lose the granularity and specificity with respect to what each individual property may have to offer through its PMS.

Current HCRS implementations use database technology, either a simple data-store or a Relational Database Management System (RDBMS), to manage information required to calculate area and hotel availability requires multiple data access operations to obtain hotel details and availability of rates and room types. Current HCRSs are based on the assumption that direct memory access to ARI was not possible given the available memory sizes in servers. Typical area availability search can require 100s to 1000s of database accesses, resulting in area availability response times in 1 second to 10 second range or more.

Also, current HCRS implementations emulate or duplicate the inventory methods and controls in PMSs, with relatively fixed room types and rate plans. In order to synchronize information between the two systems, HCRS and PMS, chains usually employ a full two-way interface (term of art) that constantly exchanges information between the two systems on rate and room availability. The "full two way interface" in HCRSs is designed to provide an exact copy of PMS information to be used for area and hotel availability. This avoids having the PMS satisfy all availability requests, at the expense of managing duplicate information across multiple hotels. In practice, the full two-way interface amounts to exchanging new, changed or cancelled bookings between the systems, and accepting updated room and rate information from the PMS if it manages rooms and rates. Many chains even force all reservations processing and product maintenance to be managed by the HCRS, even for hotel reservation agents, in order to ensure consistent responses to all channels and to prospective guests.

The conventional HCRS implementations manage all combinations of room types and rate categories, along with overriding limits for room type, rate category and total hotel availability. Moreover, the conventional HCRS systems generate availability responses as part of the HCRS application, along with managing bookings, availability, rates, inventory, room types, etc. Conventional HCRS implementations employ a complex, database intensive structure for rate plans, and have a fixed time horizon for ARI information, usually 400 days or less.

This approach had advantages given the technology available when they were first developed: it reduced the load on relatively small PMSs installed at individual hotels and eliminated the potential communications load between hotel PMSs and external channels by answering ARI and booking requests from the HCRS, while generally ensuring consistent information in both systems.

Given technology available today, the limitations imposed by this approach are significant. The PMS is essentially slaved to the HCRS, with little ability to represent unique or singular advantages of the local hotel room types. The communications load on both systems is still significant, often requiring updates multiple times each hour. The unique room types at a hotel are homogenized for the GDSs and OTAs by converting them to standard room types, and special rates and packages are also often limited to standard types.

The HCRS design and implementation has to be continually optimized to try to provide sub-second response to an ever-growing number of external sources. Even though some chains have HCRSs originally built decades ago, they have been continually refined and updated with newer technologies to adapt to larger chain size and the demands of external reservation sources. Building and maintaining a new HCRS is now assumed to be a $50 million project at a minimum, based on industry articles about current, previous and failed HCRS development and upgrade projects.

In most HCRSs, the hardware component dedicated to interfacing with external channels and PMSs for ARI information is more than 50% of total required capacity. The portion of the development and maintenance cost for the software and database required to support the current PMS/external channel interface is 25% to 50% of total costs. Based on industry publications on HCRS operating costs for hardware and software, these are multi-million dollar costs for each chain.

An informal survey of some major hotel chain reservation systems in January 2013 showed that the time to perform an area availability search (looking for rooms at all hotels in a city or area) for a multi-week stay ranged from a few seconds to more than 15 seconds. Area searches make up a significant portion of the requests handled by HCRSs, and a proportionately larger part of their total computing capacity. A new approach is needed to provide near-instantaneous response, while reducing hardware and software complexity and expense.

BRIEF SUMMARY OF EMBODIMENTS OF THE INVENTION

Accordingly, the present invention is directed to a central reservation system availability engine that substantially obviates one or more problems resulting from the limitations and deficiencies of the related art.

In accordance with one aspect of one or more embodiments of the present invention, there is provided a computer-based system for responding to requests for hotel room and rate availability, comprising: a central computing system that is configured to respond to internal and external requests, a plurality of hotel property management computing systems (e.g., either local computing systems located within the respective hotel properties themselves at a plurality of sites or locations that are remote from the central computing system, or property management computing systems located remotely from the respective hotel properties themselves which are distinct from the central computing system) configured to manage and control availability, rates and inventory for respective properties, a first of the plurality of hotel property management computing systems configured and arranged to communicate a first set of availability, rate and inventory information as needed and/or as requested, a second of the plurality of hotel property management computing systems configured and arranged to communicate a second set of availability, rate and inventory information as needed and/or as requested; a search processor, including at least one hardware component, for initiating, in response to a request, a search of availability, rate and inventory information compiled from at least one of the plurality of hotel property management computing systems; and a response processor, including at least one hardware component, for generating a response to the request to search the availability, rate and inventory information, wherein the response includes sufficient information to provide a full and accurate price for the request, and wherein the response is substantially equivalent to the response that would have been made by one or more of the plurality of hotel property management computing systems directly. In one or more embodiments, the response from the response processor is substantially equivalent to the response that would have been made by one or more of the plurality of hotel property management computing systems directly because it only differs in format, and not in substance, from that which would have been made by one or more of the plurality of hotel property management computing systems directly. Also, in one or more embodiments, the Availability Engine comprising the search and response processor may either be integrated directly into an existing hotel central reservation system (HCRS), or may be implemented as a separate search and response processor. In each of these embodiments, the "Availability Engine" as it is used herein is a computing device or computing system that provides the inventive functionality described hereinafter.

In a further embodiment of this aspect of the present invention, one or more of the plurality of hotel property management computing systems is configured to send availability, rate and inventory (ARI) information on demand (e.g., as demanded by the Availability Engine) or as required by changes in the ARI information of the respective property management computing system resulting from modifications made thereto by the property management or staff, or as required by changes in availability resulting from bookings received from multiple sources. In one or more embodiments, one or more of the plurality of hotel property management computing systems is configured to send the ARI information to the Availability Engine directly or indirectly (e.g., the information is sent indirectly to the Availability Engine if it is sent to the Availability Engine via the HCRS, in which case, the HCRS is programmed to send the information to the Availability Engine).

In yet a further embodiment, one or more of the plurality of hotel property management computing systems is configured to specify and control room types that are unique to a specific property. In one or more embodiments, the room types specified by one or more of the plurality of hotel property management computing systems are used by the Availability Engine to compile room availability information.

In still a further embodiment, one or more of the plurality of hotel property management computing systems is configured to provide ARI information for any number of future days, each of the plurality of hotel property management computing systems being configured to provide a minimum number of future days consistent with agreements with the hotel central reservation system (HCRS) provider or chain manager. In one or more embodiments, one or more of the plurality of hotel property management computing systems is configured to provide the ARI information for any number of future days to the Availability Engine directly or indirectly (e.g., the information is sent indirectly to the Availability Engine if it is sent to the Availability Engine via the HCRS, in which case, the HCRS is programmed to send the information to the Availability Engine).

In yet a further embodiment, one or more of the plurality of hotel property management computing systems is configured to provide inventory availability information in a standard format, using agreed upon standards (e.g., as promulgated by Hotel Technology Next Generation (HTNG) or Open Travel Alliance (OTA)), which include a number of rooms of each type representing the maximum quantity that are able to be sold before requesting or receiving updated information on room type inventory and availability. In one or more embodiments, one or more of the plurality of hotel property management computing systems is configured to provide the inventory availability information in a standard format to the Availability Engine directly or indirectly (e.g., the information is sent indirectly to the Availability Engine if it is sent to the Availability Engine via the HCRS, in which case, the HCRS is programmed to send the information to the Availability Engine).

In still a further embodiment, one or more of the plurality of hotel property management computing systems is configured to provide rate availability information in the form of rate groups or categories with the number of rooms that can be sold using any of the rate plans as defined for each of the rate groups or products available for sale by the Availability Engine for each day, before the Availability Engine receives or must request updated information on rate group or category inventory and availability. In one or more embodiments, one or more of the plurality of hotel property management computing systems is configured to provide the inventory availability information in the form of rate groups or categories to the Availability Engine directly or indirectly (e.g., the information is sent indirectly to the Availability Engine if it is sent to the Availability Engine via the HCRS, in which case, the HCRS is programmed to send the information to the Availability Engine).

In yet a further embodiment, one or more of the plurality of hotel property management computing systems is configured to provide detailed information for each day for each room type and for each group of rate plans, the information controlling the minimum and maximum numbers of guests, length of stay, and other controlling parameters as agreed between the HCRS, the chain and the property management system (PMS). In one or more embodiments, one or more of the plurality of hotel property management computing systems is configured to provide the detailed information for each day for each room type, and for each group of rate plans, to the Availability Engine directly or indirectly (e.g., the information is sent indirectly to the Availability Engine if it is sent to the Availability Engine via the HCRS, in which case, the HCRS is programmed to send the information to the Availability Engine).

In still a further embodiment, one or more of the plurality of hotel property management computing systems is configured to provide detailed information for each day for each room type and for each rate plan within a rate category, the information controlling the additional charges, if any, for each room type, guest or guest type, number of rooms requested and additional charges agreed between the PMS and HCRS, which include meal plans and special excursions. In one or more embodiments, one or more of the plurality of hotel property management computing systems is configured to provide the detailed information for each day for each room type, and for each rate plan within a rate category, to the Availability Engine directly or indirectly (e.g., the information is sent indirectly to the Availability Engine if it is sent to the Availability Engine via the HCRS, in which case, the HCRS is programmed to send the information to the Availability Engine).

In accordance with another aspect of one or more embodiments of the present invention, there is provided a computer-based system for responding to requests for rental car availability and rate information, comprising: a central computing system that is configured to respond to internal and external requests, a plurality of rental location computing systems (e.g., either local computing systems located at the respective rental car locations themselves that are remote from the rental car central reservation system computing system, or rental location computing systems located remotely from the respective rental car locations themselves which are distinct from the central computing system) configured to manage and control car availability, rates and inventory for respective rental car locations, a first of the plurality of rental location computing systems configured and arranged to communicate a first set of car availability, rate and inventory information as needed and/or as requested, a second of the plurality of rental location computing systems configured and arranged to communicate a second set of car availability, rate and inventory information as needed and/or as requested; a search processor, including at least one hardware component, for initiating, in response to a request, a search of car availability, rate and inventory information compiled from at least one of the plurality of rental location computing systems; and a response processor, including at least one hardware component, for generating a response to the request to search the car availability, rate and inventory information, wherein the response includes sufficient information to provide a full and accurate price for the request, and wherein the response is substantially equivalent to the response that would have been made by one or more of the plurality of rental location computing systems directly. In one or more embodiments, the response from the response processor is substantially equivalent to the response that would have been made by one or more of the plurality of rental location computing systems directly because it only differs in format, and not in substance, from that which would have been made by one or more of the plurality of rental location computing systems directly. Also, in one or more embodiments, the Availability Engine comprising the search and response processor may either be integrated directly into an existing rental car central reservation system (CRS), or may be implemented as a separate search and response processor. In each of these embodiments, the "Availability Engine" as it is used herein is a computing device or computing system that provides the inventive functionality described hereinafter.

In a further embodiment of this aspect of the present invention, one or more of the plurality of rental location computing systems is configured to send car availability, rate and inventory (ARI) information on demand (e.g., as demanded by the Availability Engine) or as required by changes in the ARI information of the respective rental location computing system resulting from modifications made thereto by the rental car location staff. In one or more embodiments, one or more of the plurality of rental location computing systems is configured to send the ARI information to the Availability Engine directly or indirectly (e.g., the information is sent indirectly to the Availability Engine if it is sent to the Availability Engine via the rental car CRS, in which case, the rental car CRS is programmed to send the information to the Availability Engine).

In yet a further embodiment, one or more of the plurality of rental location computing systems is configured to specify and control car types that are unique to the rental car location. In one or more embodiments, the car types specified by one or more of the plurality of rental location computing systems are used by the Availability Engine to compile car availability information.

In still a further embodiment, one or more of the plurality of rental location computing systems is configured to provide ARI information for any number of future days, each of the plurality of rental location computing systems being configured to provide a minimum number of future days consistent with agreements with the rental car central reservation system provider or chain manager. In one or more embodiments, one or more of the plurality of rental location computing systems is configured to provide the ARI information for any number of future days to the Availability Engine directly or indirectly (e.g., the information is sent indirectly to the Availability Engine if it is sent to the Availability Engine via the rental car CRS, in which case, the rental car CRS is programmed to send the information to the Availability Engine).

In yet a further embodiment, one or more of the plurality of rental location computing systems is configured to provide car inventory availability information in a standard format, using agreed upon standards (e.g., as promulgated by Open Travel Alliance (OTA)), which include a number of cars of each type representing the maximum quantity that are able to be sold before requesting or receiving updated information on car type inventory and availability. In one or more embodiments, one or more of the plurality of rental location computing systems is configured to provide the inventory availability information in a standard format to the Availability Engine directly or indirectly (e.g., the information is sent indirectly to the Availability Engine if it is sent to the Availability Engine via the rental car CRS, in which case, the rental car CRS is programmed to send the information to the Availability Engine).

In still a further embodiment, one or more of the plurality of rental location computing systems is configured to provide car rate availability information in the form of rate groups or categories with the number of cars that can be sold using any of the rate plans as defined for each of the rate groups, or products available for sale by the Availability Engine for each day, before the Availability Engine receives or must request updated information on rate group or category inventory and availability. In one or more embodiments, one or more of the plurality of rental location computing systems is configured to provide the inventory availability information in the form of rate groups or categories to the Availability Engine directly or indirectly (e.g., the information is sent indirectly to the Availability Engine if it is sent to the Availability Engine via the rental car CRS, in which case, the rental car CRS is programmed to send the information to the Availability Engine).

In accordance with yet another aspect of one or more embodiments of the present invention, there is provided a computer-based system for responding to requests for airline seat availability and rate information, comprising: a central computing system that is configured to respond to internal and external requests, a plurality of airline computing systems (e.g., either local computing systems located at the respective airports themselves that are remote from the airline central reservation system computing system, or airline computing systems located remotely from the respective airports themselves which are distinct from the central computing system) configured to manage and control airline seat availability, rates and inventory to a plurality of destinations from a respective airport, a first of the plurality of airline computing systems configured and arranged to communicate a first set of airline seat availability, rate and inventory information as needed and/or as requested, a second of the plurality of airline computing systems configured and arranged to communicate a second set of airline seat availability, rate and inventory information as needed and/or as requested; a search processor, including at least one hardware component, for initiating, in response to a request, a search of airline seat availability, rate and inventory information compiled from at least one of the plurality of airline computing systems; and a response processor, including at least one hardware component, for generating a response to the request to search the airline seat availability, rate and inventory information, wherein the response includes sufficient information to provide a full and accurate price for the request, and wherein the response is substantially equivalent to the response that would have been made by one or more of the plurality of airline computing systems directly. In one more embodiments, the response from the response processor is substantially equivalent to the response that would have been made by one or more of the plurality of airline computing systems directly because it only differs in format, and not in substance, from that which would have been made by one or more of the plurality of airline computing systems directly. Also, in one or more embodiments, the Availability Engine comprising the search and response processor may either be integrated directly into an existing airline central reservation system (CRS), or may be implemented as a separate search and response processor. In each of these embodiments, the "Availability Engine" as it is used herein is a computing device or computing system that provides the inventive functionality described hereinafter.

In a further embodiment of this aspect of the present invention, one or more of the plurality of airline computing systems is configured to send seat availability, rate and inventory (ARI) information on demand (e.g., as demanded by the Availability Engine) or as required by changes in the ARI information of the respective airline computing system resulting from modifications made thereto by airline staff. In one or more embodiments, one or more of the plurality of airline computing systems is configured to send the ARI information to the Availability Engine directly or indirectly (e.g., the information is sent indirectly to the Availability Engine if it is sent to the Availability Engine via the airline CRS, in which case, the airline CRS is programmed to send the information to the Availability Engine).

In yet a further embodiment, one or more of the plurality of airline computing systems is configured to specify and control seat quantities and types that are unique to aircraft departing from its respective airport location. In one or more embodiments, the seat quantities and types specified by one or more of the plurality of airline computing systems are used by the Availability Engine to compile seat availability information.

In still a further embodiment, one or more of the plurality of airline computing systems is configured to provide ARI information for any number of future flights, each of the plurality of airline computing systems being configured to provide a minimum number of future flights consistent with agreements with the airline central reservation system provider or airline management. In one or more embodiments, one or more of the plurality of airline computing systems is configured to provide the ARI information for any number of future flights to the airline Availability Engine directly or indirectly (e.g., the information is sent indirectly to the airline Availability Engine if it is sent to the Availability Engine via the airline CRS, in which case, the airline CRS is programmed to send the information to the Availability Engine).

In yet a further embodiment, one or more of the plurality of airline computing systems is configured to provide seat inventory availability information in a standard format, using agreed upon standards (e.g., as promulgated by Open Travel Alliance (OTA)), which include a number of seats on each flight representing the maximum quantity that are able to be sold before requesting or receiving updated information on seat inventory and availability. In one or more embodiments, one or more of the plurality of airline computing systems is configured to provide the inventory availability information in a standard format to the Availability Engine directly or indirectly (e.g., the information is sent indirectly to the Availability Engine if it is sent to the Availability Engine via the airline CRS, in which case, the airline CRS is programmed to send the information to the Availability Engine).

In still a further embodiment, one or more of the plurality of airline computing systems is configured to provide rate availability information in the form of rate groups or categories with the number of seats that can be sold using any of the rate plans as defined for each of the rate groups, or products available for sale by the Availability Engine for each flight, before the Availability Engine receives or must request updated information on rate group or category inventory and availability. In one or more embodiments, one or more of the plurality of airline computing systems is configured to provide the inventory availability information in the form of rate groups or categories to the Availability Engine directly or indirectly (e.g., the information is sent indirectly to the Availability Engine if it is sent to the Availability Engine via the airline CRS, in which case, the airline CRS is programmed to send the information to the Availability Engine).

It is to be understood that the foregoing general description and the following detailed description of the present invention are merely exemplary and explanatory in nature. As such, the foregoing general description and the following detailed description of the invention should not be construed to limit the scope of the appended claims in any sense.

BRIEF DESCRIPTION OF THE SEVERAL VIEWS OF THE DRAWINGS

The invention will now be described, by way of example, with reference to the accompanying drawings, in which:

FIG. 7 is a block diagram of the main processing modules in the software architecture of the system (it should be noted that standard maintenance and management modules are assumed to be part of the overall software architecture but are elided for clarity), according to an embodiment of the invention;

FIG. 8 shows a representative message from an external or internal source requesting availability of hotels in the Chicago area for dates in May 2013 (the message is in standard format for an Open Travel Alliance (OTA) area availability message with a message ID of "OTA_HotelAvailRQ"), according to an embodiment of the invention;

FIGS. 9A-9C show a response from an exemplary system, indicating which hotels in the requested area have availability, and the minimum rate available for each hotel (for brevity, the message shows only the first few hotel availabilities), according to an embodiment of the invention; and FIG. 10 shows a standard OTA message requesting detailed rate and room type availability for a hotel, usually but not always sent from an external or internal source based on the response to the area availability request, according to an embodiment of the invention;

FIGS. 11A-11D show a detailed response from an exemplary system for rates and room types available at the requested hotel for the dates, number of rooms, adults and children specified in the request (again, the message is abbreviated for clarity), according to an embodiment of the invention.

Throughout the figures, the same components of the system are always denoted using the same reference characters so that, as a general rule, they will only be described once.

DETAILED DESCRIPTION OF THE PREFERRED EMBODIMENTS OF THE INVENTION

Figure 1:
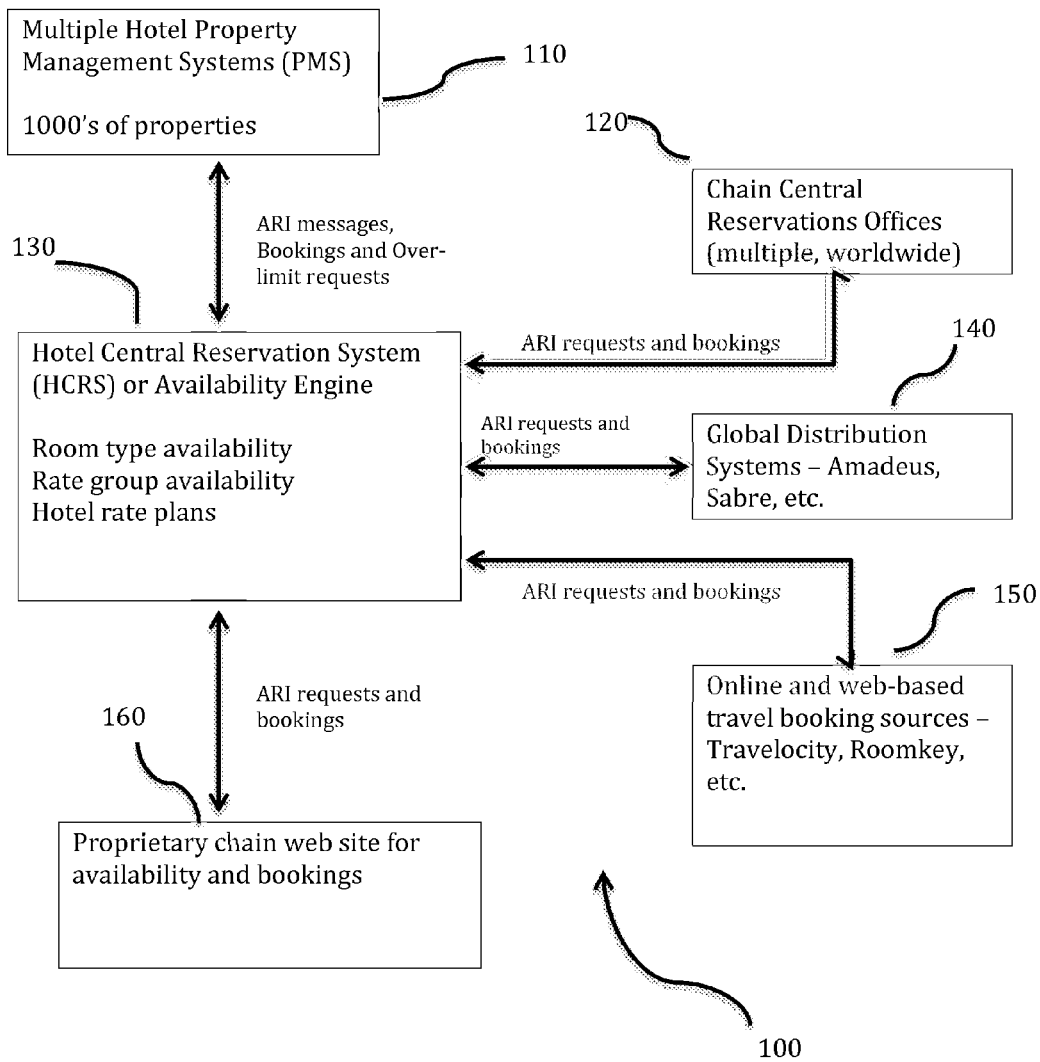
FIG. 1 is a block diagram illustrating an exemplary flow of information among the PMS, HCRS or Availability Engine, and distribution channels, according to an embodiment of the invention.

The present invention is described herein, in an exemplary manner, with reference to data processing system architecture and flowcharts that illustrate exemplary processes carried out by the Availability Engine. While the functionality of the Availability Engine is described primarily in conjunction with a hotel central reservation system, it is to be appreciated that the functionality described herein is equally applicable to a rental car central reservation system and an airline central reservation system. In a preferred embodiment, functional blocks of the flowchart illustrations can be implemented by computer program instructions. These computer program instructions may be loaded directly onto an internal data storage device of a data processing system (e.g., a hard drive of a computer). Alternatively, these computer program instructions could be stored on a portable computer-readable medium (e.g., a flash drive, a floppy disk, a compact disk, etc.), and then subsequently loaded onto a data processing system such that the instructions can be executed thereby. In other embodiments, these computer program instructions could be embodied in the hardware of the data processing system, rather than in the software thereof, or in a combination of both hardware and software. Thus, as used herein, it is to be understood that, when a computer, computing device, or computer system is said to be configured and arranged to perform one or more steps or functions, this is equivalent to reciting that the computer, computing device, or computer system is specifically programmed or specially programmed to carry out the one or more steps or functions.

For the sake of brevity, conventional data processing system components, conventional data networking, and conventional software coding will not be described in detail herein. Also, it is to be understood that the connecting lines shown in the block diagram(s) included herein are intended to represent functional relationships and/or operational couplings between the various components. Similarly, connecting lines are also used between the elements of the flowcharts in order to illustrate functional relationships there between. In addition to that which is explicitly depicted, it is to be understood that many alternative or additional functional relationships and/or physical connections may be incorporated in a practical application of the system.

When referred to herein, it is to be understood that a computing device or computing system may comprise all of the typical components associated with such a device or system, such as at least one microprocessor for processing data, memory (e.g., random access memory or RAM) for storing data during the processing thereof, and at least one data storage device for non-volatile data storage (e.g., a hard drive, a compact disk drive, etc.). Moreover, it is to be understood that a processor, when referred to herein, may comprise at least one hardware component, such as a microprocessor, etc.

The system and method described in conjunction with the embodiments of the present invention reduces or eliminates the limitations of current practices, especially the cost of operation for HCRSs, while maintaining or in most cases enhancing the advantages enjoyed by the current systems.

In brief, the system and method accepts room and rate availability and detailed rate plan details from a PMS in "native" form, i.e. in the form known to the hotel, maintains that information in a central repository, and responds to ARI and booking requests as if the external sources were interacting directly with the PMS.

The complicated and expensive hardware, software and database implementations in current HCRSs can be replaced by this system and method using one of many possible approaches. In one possible embodiment, the system and method could be a web-based service, where PMSs send update information directly to the web service, and the web service acts as the interface to external distribution systems. In this case, or as a possible alternative embodiment, the HCRS could maintain connections it already has with PMSs and GDS/OTA channels, and re-route traffic to and receive responses from the web service.

In a second possible embodiment, the system and method could be implemented as an appliance attached to the HCRS. Appliances are well known in the technology field and range from Google search engines to security to email processors. Each is a specialized system, process and program embedded in a physical appliance that usually sits next to the appropriate system. Current HCRS implementations could be changed easily to redirect traffic to and from PMSs and GDS/OTAs to the appliance.

In another possible embodiment of the invention, the system could be implemented as a standalone service routine accessible directly from the HCRS, not unlike a subroutine or service call, using techniques like Inter-Process Communication (IPC, a term of art), but integrated directly with the existing HRCS code and replacing the portion of the HCRS now performing these functions.

It should be emphasized that any of these embodiments could be further enhanced by having the Availability Engine completely replace a traditional HCRS implementation, by providing the availability functionality as described above, but relying on each hotel's PMS for all other reservations functionality, including bookings, changes, cancellations and confirmations. This embodiment could obviously be reached on a gradual basis rather than as an instantaneous replacement.

Many other possible embodiments that combine or use portions of the above implementations could also be construed as possible embodiments of the invention. The invention would replace a large portion of database logic and access associated with some current implementations that use RDBMS technology, while providing far higher service levels.

The demonstration and exemplary implementation uses one of many readily available programming languages and a standard data store, but many other implementation choices for programming language or data store are of course possible. Note however that the system of the invention does not require or need a relational database management system (RDBMS), and instead uses simple data management and data storage techniques. In addition, the system of the invention is not dependent on any particular operating system (OS) or hardware for its use.

1. Major Design Features

The two most frequent availability requests received by a HCRS are for area availability (shown for example in FIG. 8) and property availability (shown for example in FIG. 10). Each type of request generates a different form of response (shown for example in FIGS. 9A-9C and FIGS. 11A-11D respectively), and places different demands on the HCRS.

The area availability request looks for the best rate available at all hotels in a geographic area, usually a city. These requests can also specify a particular room type and/or rate type. For area searches, the most common requests are for the "best available rate", special rates such as AAA or Senior, or for special offer codes and corporate rates. The response to an area search is a list of hotels with available rooms, the lowest available rate (or the requested special rate) and a mechanism to request more detailed information about a particular hotel. In major cities the area search can return 20 or more hotels for a medium-size chain, and 50 or more for a large chain.

Area searches can take from a few seconds to 15 seconds or more, depending on the size of the chain, the number of hotels in an area and the length of stay. HCRSs sometimes employ a degree of special coding to speed up the search. These usually take the form of pre-calculated information about availability of a basic room type, or pre-defined "lowest" rate plans to eliminate the need to search all available rate plans.

The property availability search looks for all available room types at a property, and all available rate plans for each room type. In the past, and even today for some chains and HCRSs, the number of room types and rate plans kept in the HCRS was limited and standardized, even though each property might have many more room types and plans available and managed by the PMS. This was one method of limiting the computing resources and the HCRS response time for both area and property searches.

For standardized brands within chains, such as Marriott Courtyard, Holiday Inn Express and Hyatt Place, the number of room type and rate plans tend to be limited so searches are still fast. For larger properties, and especially for resorts, the PMS may keep track of and manage 20-30 distinct room types. It is also common for these properties to have 10 or more rate groups that are managed by their revenue management systems, and each rate group can have dozens or hundreds of rate plans. The typical solution for many HCRSs is to limit the number of room types and rate plans maintained in the HCRS. For some HCRSs that limit room types and/or rate plans, it may be the case that calling a property directly can result in better rates and availability, despite what all major chains try to achieve, namely the same rate to all channels of distribution.

In initial tests using this invention, the response time to area searches comparable to the examples above is reduced to below 100 milliseconds using the proprietary methods in the system. Since "first to respond" is often first to be displayed, this can represent a significant advantage to a chain or representation company beyond the cost savings.

The invention uses innovative techniques to ensure that responses to area and property availability requests are relatively unaffected by the number of days of ARI maintained, the number of properties, or the number of individual rates and room types deployed by each property. In an exemplary implementation on an older personal computer, an area search that covered 20 properties for 28 days took less than 100 milliseconds. It is to be expected that the system of the invention implemented on currently available systems would be well below 100 milliseconds, even for more extensive searches.

By convention in the hotel industry, rate plans are organized into rate groups or rate categories that are treated as "qualified" if the request must include specific qualifying information, or "unqualified" if the rate plans are available to all. Qualified rates include rate plans for Senior, AAA, Government, etc. Other qualified rate plans include negotiated discounts for companies or agencies, where the rate plan identifier must be included on the availability request. Still other qualified plans include conventions and groups where the convention or group identifier must be included. For example, a rate group may include corporate rate plans for a plurality of different corporations. In such a case, each respective corporation would have its own rate plan which is a part of the rate group. The rate plan for each corporation contains the details as to how the rates are determined for that particular corporation (i.e., how the rates are calculated for the hotel rooms).

The system of the invention can include indicators for which rate groups or categories are unqualified and generally available, and which require a qualifying identifier. The only distinction in how the system manages the rate groups and rate plans within each group is whether all unqualified rate groups and plans are searched for each area availability and property availability search. Hotel chains with many discount and vacation plans may present a confusing array of choices to prospective guests, and may use other techniques to narrow the choices, or specify that discount, vacation and other rate plans may need to include a special offer code in the request to distinguish them. Both approaches are fully supported in the system.

Travel agents and many distribution channels use the term "product" to describe the combination of a specific room type and rate plan, or a generic room type and the specific rate plan. A different but equivalent method of expressing availability between a PMS and the HCRS would signal availability of rate plans directly rather than using rate groups. The system of the invention can easily support products as the common method for availability updates from a PMS with only a few minor changes.

Combining room types and rate plans into products will simplify availability management for the PMS and allow for a higher level of granularity with respect to how room types affect rate plans and rates. It also allows the PMS and HCRS to present a more limited and likely more useful array of choices. Instead of 10 room types displayed for each of three rate plans, the property revenue management process could reduce the number of choices to those calculated to be the most attractive based on sales history and customer surveys.

The system and method of the invention lend themselves directly to adapting a mixed environment of availability-based and inventory-based PMS implementations. During the initial implementation of the system, existing PMS ARI messages could be maintained and converted to the brief form allowed by the system, instead of the exhaustive 2-way interface employed.

For example, the interpreted messages with ARI information from a PMS could include total inventory counts for each room type. In this case the HCRS would sell against that inventory and decrement as bookings are made. The PMS would update the HCRS as inventory counts changed as a result of an HCRS booking or if the property made bookings, room changes etc.

In U.S. Pat. No. 5,404,291 Kerr et al taught that rate group inventory and room type inventory could be precisely controlled for all combinations of room type and rate group, as well as for the maximum values for each room type and rate group, and for total hotel. This approach had a number of advantages, specifically the granularity allowed in specifying not-to-exceed numbers for certain combinations or products. However, Kerr was designed to manage a centrally controlled inventory, or the authoritative source for determining availability.

Kerr contemplated and allowed for multiple room types with differing attributes. For instance, rather than having 100 King room types, the invention allowed for having 50 King, 25 King Ocean View, 10 King Hi-Floor, etc. It also contemplated and provided a means to use rate groups and rate plans to distinguish availability and rates for rooms with differing attributes. For instance, 10 King rooms could be allocated to a rate plan for Ocean view, and those rooms would not be available to other rate groups.

The system and method of this invention provides a more general and powerful approach because it is only concerned with the next booking, not total inventory of all room types and rate groups. In particular, a room-type-aware PMS could signal the Availability Engine that it had one (1) King, one (1) King Ocean View and one (1) King Ocean View Hi-Floor rooms available for sale, each at a different rate, even though only the King Ocean View Hi-Floor room was available. Each of these room types with their associated rates would show as available. If any of the room types was confirmed in a reservation, the PMS would close all three types. This ability to indicate availability for room types with overlapping features or amenities is not a capability of most current HCRSs.

The same logic can be applied to rate groups with respect to managing rate plan availability that calls for different room types. Each rate plan can specify which room types are valid for sale under that plan, adding an additional discriminant to ensure only the right combination of room type attributes are committed in each booking.

It should be noted that the information in availability response messages (OTA_HotelAvailRS) represents the best and most accurate information available at the moment. The responses do not guarantee that the rate or room will be available if a booking request follows the availability request. Holding inventory for every request is impractical given the large number of availability requests compared to the number of resulting bookings.

Special note should be taken of the ephemeral nature of availability information. It exists in a semi-constant state until more updated information is provided by a PMS, or until a booking request is received and accepted, changing the availability state. During this period of stasis a PMS can create a room type with an arbitrary set of attributes, good until cancelled, or until the next booking changes the availability state. The idea of fixed room types with fixed attributes is another artifact of the initial design concepts for HCRSs.

The same can be said of rate plans. They can exist for the duration of a consistent availability state, they can be added or removed (availability can be turned on or off) by a PMS based on conditional logic, like time of day, or any other factor considered in a revenue management scheme. By combining the ideas of arbitrary room type attributes and fleeting rate plans, much more elaborate and functional packages can be created in ways not possible with current HCRS designs, or with the relatively fixed transactions between PMSs and HCRSs in today's environment.

Booking request messages (OTA_HotelResRQ) can be handled in a number of ways in this system and method. For instance, the booking request can be sent directly to the PMS for a response. This method would be employed where the PMSs are connected to the HCRS in a communication network with high availability.

In one possible embodiment, the system could decrement available inventory for the requested room type and rate plan and send the booking request to the PMS for further processing. The PMS would then send an updated set of availability for room type and rate plan, as and if necessary to maintain a consistent representation of availability in the Availability Engine.

Another possible approach would have the Availability Engine respond to the request based on information therein. After accepting the booking, the appropriate inventory of room type and rate group would be adjusted, and further availability or booking requests would be handled with the extant information until updates were received from the PMS (or entered manually if necessary).

Another possible approach would make the Availability Engine an adjunct to an existing HCRS, only managing availability requests, and the booking message could be passed to a booking module in the HCRS.

In all these examples, the requests are responded to as received, with a confirmation number or an unsuccessful status as defined in the OTA specification or as agreed with specific partners.

Changes and cancellation messages could continue to be handled by the PMS or the HCRS due to the extensive rules governing each kind of change or cancellation. This logic could of course be adapted and included in one embodiment of the invention.

It should be noted that HCRSs duplicate not only the availability logic already in PMSs, but also the booking logic, including extensive rules for credit card guarantees and processing as well as management of amenities, etc. It is clearly simpler to have the PMS accept and manage all bookings, rather than duplicating logic in a central system.

By delegating many of these functions to the PMS, the size, structure and complexity of the HCRS can be reduced to a combination of message processing and translation. Detailed property information can be maintained within the HCRS, copied from the PMS, to reduce traffic load on the PMS if necessary, along with other data such as guest history and property bookings that could be compiled into a composite database.

Other functions of an HCRS are usually independent subsystems such as Revenue Management and Frequent Guest tracking, and these would continue to exist within an HCRS replacement system based on the Availability Engine, or as standalone subsystems. The potential savings are very high, with no reduction in guest services or the needs of central supervision of rates and customer service protocols.

In summary, the major functions now performed by HCRSs can be replaced by the Availability Engine with direct connections to PMSs, with no loss of functionality and with greater simplicity of implementation, reduced cost, and faster and more complete responses to potential guests through all distribution channels. The design of the Availability Engine is ideally suited to this approach.

2. Detailed Design of the System

In FIG. 1, the overall flow of information among the various entities is described, and is represented generally by reference numeral 100. To simplify the explanation, Distribution Channels include not only Online Travel Agencies (Travelocity, Expedia et al) and Global Distribution Systems (Sabre, TravelPort et al) but also those that may come from a proprietary web site or agents in an internal reservation call center. The latter transactions may be processed by existing modules within an HCRS and passed to the Availability Engine as a transaction, in XML or some other defined form.

The box in the flowchart of FIG. 1 denoted by reference numeral 110 represents the multitude of Property Management Systems within the chain or group, connected to the HCRS in a communication network that carries ARI messages as well as property static information to the HCRS, and receives booking requests or messages from the HCRS, and possibly over-limit requests for certain types of products.

In the flowchart of FIG. 1, box 120 represents the chain's worldwide reservations offices that communicate directly with prospective guests through 800 number services, and sometimes fax requests and booking lists provided electronically for group bookings. The reservation centers may continue to connect directly to the existing HCRS services since these tend to be highly customized by chain. However, the actual availability requests could still be handled by the method described within this invention.

Box 130 in the flowchart represents the core of the system. The HCRS provides services to requestors from the other sources within this diagram, including 110 PMSs, 120 Chain CROs, 140 GDSs, 150 OTAs, and 160 Chain web site(s). The HCRS is normally composed of multiple service modules including availability, inventory management, rate management, guest history, revenue management, property information and several others. The scope of this invention encompasses all HCRS services for availability, inventory and rate management and static property information. Specific descriptions of these functions are shown in FIGS. 2-5.

Referring again to FIG. 1, box 140 of the flowchart represents GDSs, which send availability requests, booking requests and property information requests to the HCRS using a number of formats, with the Online Travel Alliance (OTA) format beginning to dominate due to its standardized format.

Box 150 of the flowchart represents OTAs, which also send availability, booking and property information requests to the HCRS, usually in OTA format. In some cases, both GDSs and OTAs communicate to HCRSs through intermediaries such as Pegasus or Amadeus, but the content in the messages received and responses sent are the same whether received directly or through an intermediary, differing only in message format.

In FIG. 1, box 160 represents the proprietary web site employed by most chains to provide a direct link from the prospective guest to the chain HCRS. Most chains also claim that their web site provides the lowest available rate, or "best rate guarantee".

Figure 2:
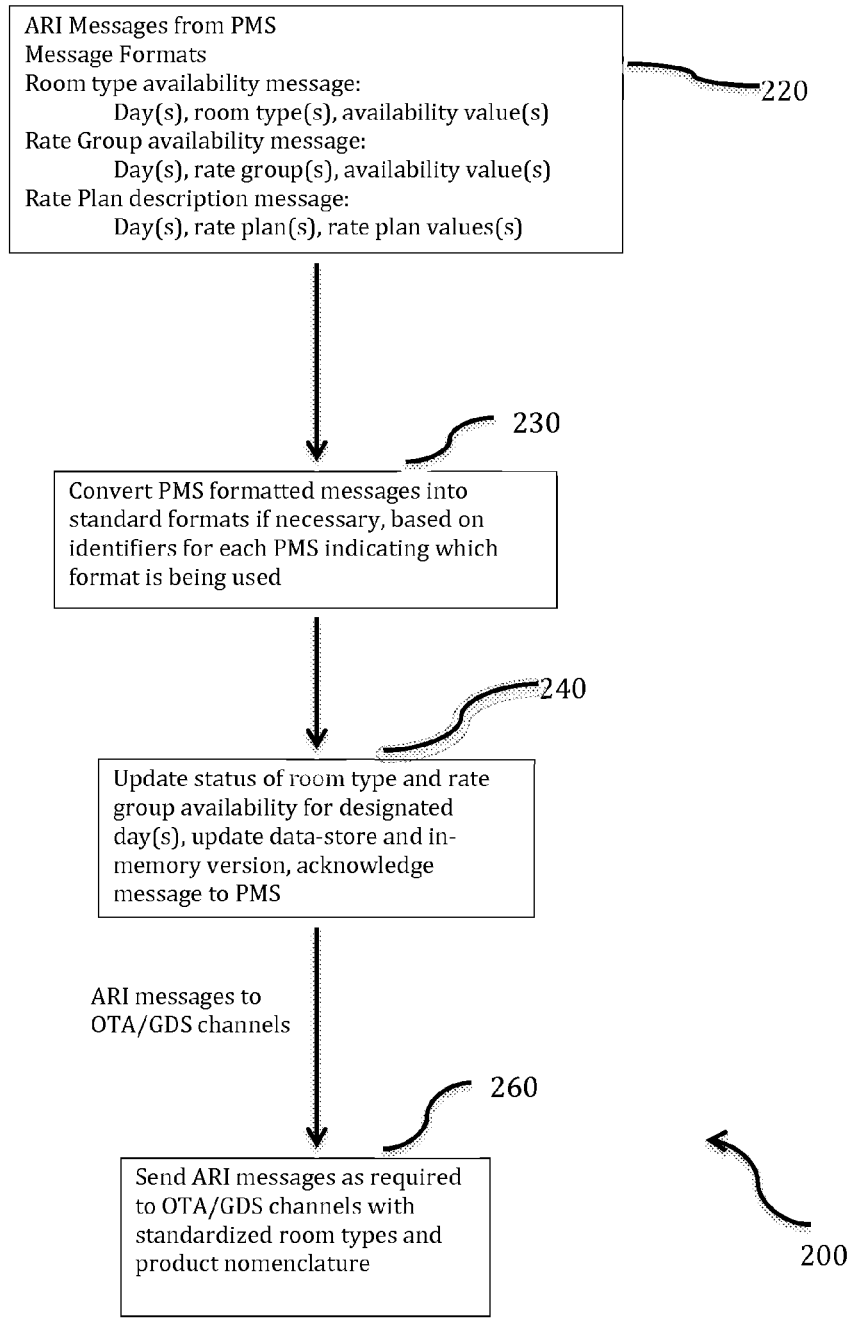
FIG. 2 is a flowchart illustrating a logical flow of ARI information, as processed by an Availability Engine, from hotel PMSs to external channels, according to an embodiment of the invention.

Now, turning to FIG. 2, the process flow for ARI information from PMSs to the external channels is described, and is represented generally by reference numeral 200. The processing steps set forth in FIG. 2 are carried out by the Availability Engine. These messages are asynchronous, sent by PMSs as rate and inventory information changes within the PMS due to property events (e.g. guest changes room type at check-in) or when rate information or availability changes (e.g. property updates rates for a room type or rate plan. Similarly, when a Revenue Management System, whether part of the PMS, the HCRS, or as a standalone system, creates updates to rate information, these updates would also be sent to the Availability Engine. Standard transaction processing methods would be employed to manage simultaneous requests from multiple sources, to enable restart or transaction retry, and to log both inbound and outbound transactions to ensure ACID properties are maintained. As known in the computer science art, ACID (Atomicity, Consistency, Isolation, Durability) is a set of properties that guarantee that database transactions are processed reliably.

Box 220 in FIG. 2 describes the general form of the ARI messages for room type availability, rate group availability and detailed rate plan descriptions and parameters. More detail on the information in each of these messages is provided in the section 3 of this document, entitled "Detailed Design—Data Formats and Interpretations". There are a multitude of PMSs in the chain, and ARI messages are sent to the HCRS. Note that an equivalent process would exist for the HCRS to request updated ARI information to recover lost information, when the Availability Engine makes a booking and sends the booking to the PMS, and possibly other reasons.

In step/box 230 of FIG. 2, PMS formatted messages are converted into standard formats (if required). Because most chains have multiple types of PMSs, and even with the same PMSs may have different releases in the field, it is likely that a standardization process as described by this step would be necessary.

In step 240, the Availability Engine information is updated based on the messages from the PMS. The updates occur in memory as well as being committed to a data-store for recovery purposes, or for less frequently used information such as availability for multiple years in advance. Within this process the Availability Engine would also do normal data processing functions to log messages, send confirmations if necessary to the PMS, or update redundant Availability Engines as described in the section 3 of this document, entitled "Detailed Design—Data Formats and Interpretations". As shown in FIG. 2, ARI messages are sent from the Availability Engine to OTA/GDS channels.

Then, in step 260 of FIG. 2, ARI information is forwarded to select OTA/GDS channels that rely on ARI for their customers. These channels use ARI information to provide responses instead of sending availability requests to the HCRS in order to reduce load on the HCRS, but also and likely more to the point, to provide timely response to their customers, even if the information may be generalized and not fully descriptive. It should be readily apparent that these OTA/GDS s could instead rely on the Availability Engine to provide availability information given the dramatically reduced response time of the Availability Engine, and at the same time offer their customers better and more complete information, in effect directly from the PMS.

Figure 3:
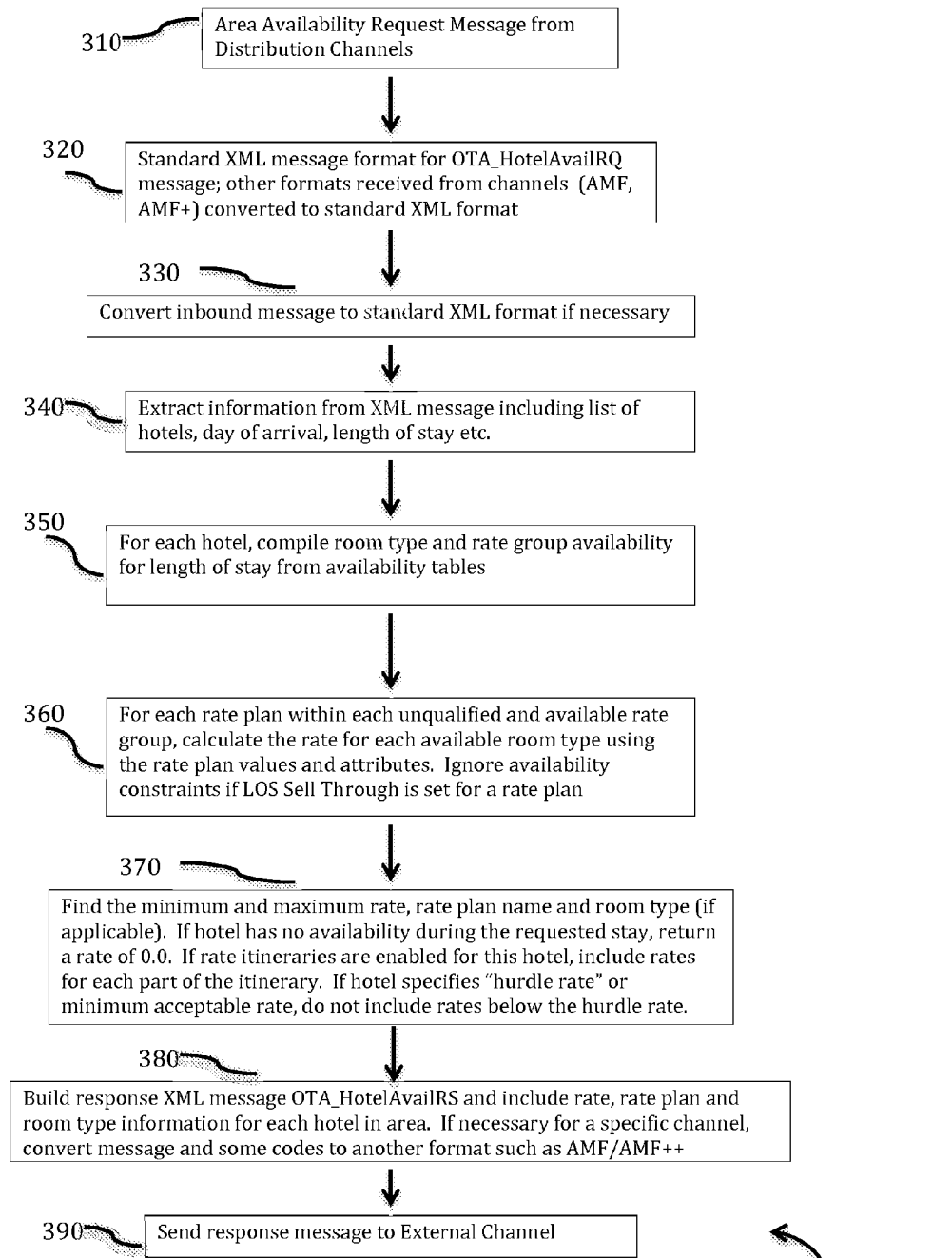
FIG. 3 is a flowchart illustrating a logical flow of area availability requests to HCRS, or directly to the Availability Engine, from external channels, according to an embodiment of the invention.

Next, turning to FIG. 3, the process flow for area availability is described, and is represented generally by reference numeral 300. The processing steps set forth in FIG. 3 are carried out by the Availability Engine. In particular, the processing steps in FIG. 3 pertaining to the generation of the response are performed by the response processor of the Availability Engine. To simplify the explanation, "External Channels" in general means not only OTA/GDS availability transactions but also those that may come from a proprietary web site or agents in an internal reservation call center. The latter transactions may be processed by existing modules within an HCRS and passed to the Availability Engine as a transaction, in XML or some other defined form. Standard transaction processing methods would be employed to manage simultaneous requests from multiple sources, to enable restart or transaction retry, and to log both inbound and outbound transactions to ensure ACID properties are maintained.

Box 310 of FIG. 3 represents the sources for area availability requests, while box 320 refers to the standard OTA message format for area availability, OTA_HotelAvailRQ. This format uses XML but other formats such as AMF or AMF+ used by airline CRS s would be converted to XML or decoded directly as indicated in 330.

In step/box 330 of FIG. 3, the inbound message is converted to standard XML format (if required). In step 340, key values are extracted from the inbound message, including but not limited to rate type, rate code if specified, room type code if specified, hotel code(s), airport code or city name to indicate the area of interest, dates of arrival and departure, number of rooms, adults and children, frequent guest ID, etc. The information is organized into a standard internal form.

In step 350, the system compiles availability information for each hotel for room types and rate groups based on arrival and departure dates. For each hotel, the system compiles the set of rate plans available for the arrival date.

Step 360 begins the process of identifying which room type and rate plan combinations are available for each hotel, based on restrictions that apply for each rate plan such as length of stay or maximum number of rooms requested. See section 3 below, entitled "Detailed Design—Data Formats and Interpretations", for examples of rate plan rate modifiers and example restrictions or qualifiers.

Then, in step 370, each rate plan and room type combination within each hotel is reviewed and the minimum and maximum rate and room type is identified, if applicable. If there are no room and rate combinations available for the requested dates and parameters, a rate of 0.0 is returned indicating no availability for that hotel. Other signals of lack of availability are of course possible. The requesting source can also be informed about which restriction resulted in no availability, such as length of stay. If rate itineraries were enabled for a hotel (i.e., different rates for different days), the effective dates of each rate would be returned (e.g., the rate for a room is $150.00 per day on Wednesdays and Thursdays, but the rate for the same room is $175.00 on Fridays and Saturdays). Rate itineraries are implied if the rate tables give rates for each day of a stay vs. average rate based on length of stay. This is of course variable by hotel under program control within the system, as those skilled in the art would recognize.

In step 380, a response message is constructed based on the minimum and maximum rates for each hotel, rate plan and room type if specified, and the dates of arrival and departure. The message is assumed to be in OTA standard XML format for the OTA_HotelAvailRS response message. As necessary the message could alternatively be formatted in the form required by the external source, which might also include extra information as agreed between the source and the hotel chain or property.

Finally, in step 390, the response message is sent to the requestor, and the message is logged, if required. The exemplary message in FIGS. 9A-9C is one example of a response by the response processor of the Availability Engine that includes sufficient information to provide a full and accurate price for an area availability request.

Figure 4:
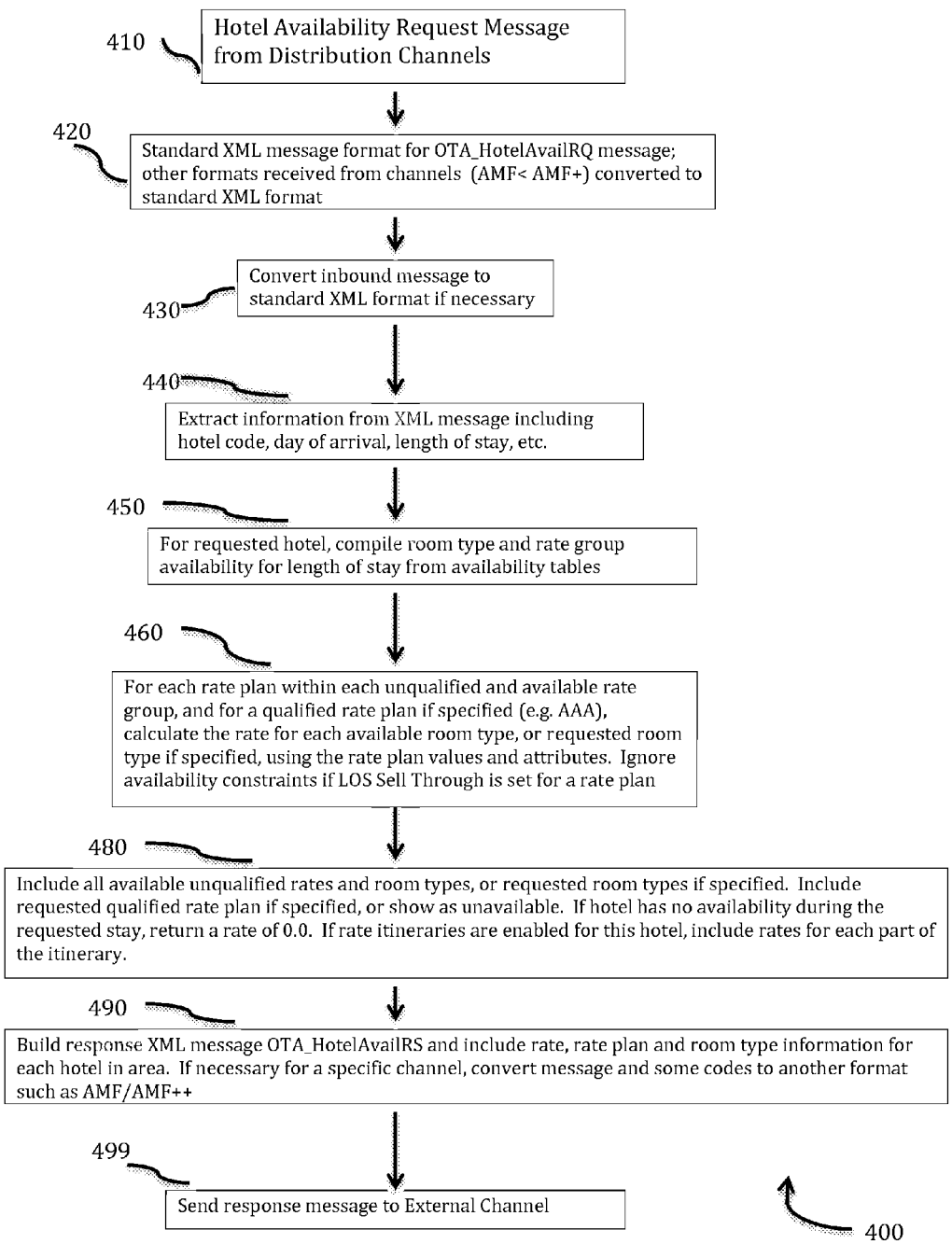
FIG. 4 is a flowchart illustrating a logical flow of hotel availability requests to HCRS, or directly to the Availability Engine, from external channels, according to an embodiment of the invention.

Next, with reference to FIG. 4, the process flow for hotel availability is described, and is represented generally by reference numeral 400. The processing steps set forth in FIG. 4 are carried out by the Availability Engine. In particular, the processing steps in FIG. 4 pertaining to the generation of the response are performed by the response processor of the Availability Engine. To simplify the explanation, "External Channels" in general means not only OTA/GDS availability transactions but also those that may come from a proprietary web site or agents in an internal reservation call center. The latter transactions may be processed by existing modules within an HCRS and passed to the Availability Engine as a transaction, in XML or some other defined form.

Box 410 in FIG. 4 represents a Hotel Availability Request Message that is inbound from a distribution channel. Standard transaction processing methods would be employed to manage simultaneous requests from multiple sources, to enable restart or transaction retry, and to log both inbound and outbound transactions to ensure ACID properties are maintained.

Box 420 describes the standard form of XML message expected from external channels, the OTA_HotelAvailRQ message requesting product information (rates and room type availability) for a specific hotel.

In step/box 430, the inbound availability requests are translated from non-OTA XML formats if necessary, while preserving format type for later use in step 490 to convert OTA XML format back to a non-standard format such as AMF or AMF+. An exemplary message in brief form is shown in FIG. 10.

In step 440, the key values are extracted from the inbound message, including but not limited to rate type, rate code if specified, room type code if specified, hotel code, dates of arrival and departure, number of rooms, adults and children, frequent guest ID, etc. The information is organized into a standard internal form, such as that shown below:

property RQ['hotelcodes']=hotelcodes
property RQ['daterange']=[checkindate,checkoutdate]
property RQ['rateplans']=rateplans
property RQ['roomtypes']=roomtypes Next, in step 450, the system compiles availability information for the hotel for room types and rate groups based on arrival and departure dates, along with the set of rate plans available for the arrival date.

Step 460 begins the process of identifying which room type and rate plan combinations are available for the hotel, and which requested qualified rates are available, based on restrictions that apply for each rate plan such as length of stay or maximum number of rooms requested. The example below shows how the information could be organized in internal form:

'RoomType': ['GuaranteeReqd', 'KING'], 'Room Descr': [rateplan+'/'+roomtype+ . . . ],
'RatePlan': ['RACK', '14'], 'Dates': ['2013-03-22', '2013-03-25'], 'Rooms': [1],
'RoomRate': [['Base', '243.00', 'USD'], ['Total', '972.00', '1069.20', 'USD']],
    'Cancel': ['48H'], 'Hotel': ['BasicPropertyInfo', 'HZ', 'HZ001']

Refer to section 3 below, entitled "Detailed Design—Data Formats and Interpretations", for examples of rate plan rate modifiers and example restrictions or qualifiers.

In step 480, each rate plan and room type combination for the requested hotel is reviewed in order to determine which are available. If there are no room and rate combinations available for the requested dates and parameters, a rate of 0.0 is returned indicating no availability for the hotel. Other signals of lack of availability are of course possible. The requesting source could also be informed about which restriction resulted in no availability, such as length of stay. If rate itineraries were enabled for the hotel, the effective dates of each rate would be returned. Rate itineraries are implied if the rate tables give rates for each day of a stay vs. average rate based on length of stay. This is of course variable by hotel under program control within the system, as those skilled in the art would recognize. Finally, if a hotel has specified a "hurdle rate" (i.e., a minimum specified rate) for a day of arrival and length of stay combination, the system would eliminate those rate plan and room type combinations which have a total rate as calculated by the room type, number of adults, etc. that does not meet the minimum rate required.

Then, in step 490, a response message is built including all applicable and available room type and rate plan combinations, repeating the request information for dates of arrival and departure, etc. The message is assumed to be in OTA standard XML format for the OTA_HotelAvailRS response message. As necessary the message could alternatively be formatted in the form required by the external source, which might also include extra information as agreed between the source and the hotel chain or property. A representative example of the resulting message is shown in FIGS. 11A-11D. The exemplary message in FIGS. 11A-11D is one example of a response by the response processor of the Availability Engine that includes sufficient information to provide a full and accurate price for the hotel availability request.

Finally, in step 499, the response message is sent to the requestor, and the message is logged if required.

Figure 5:
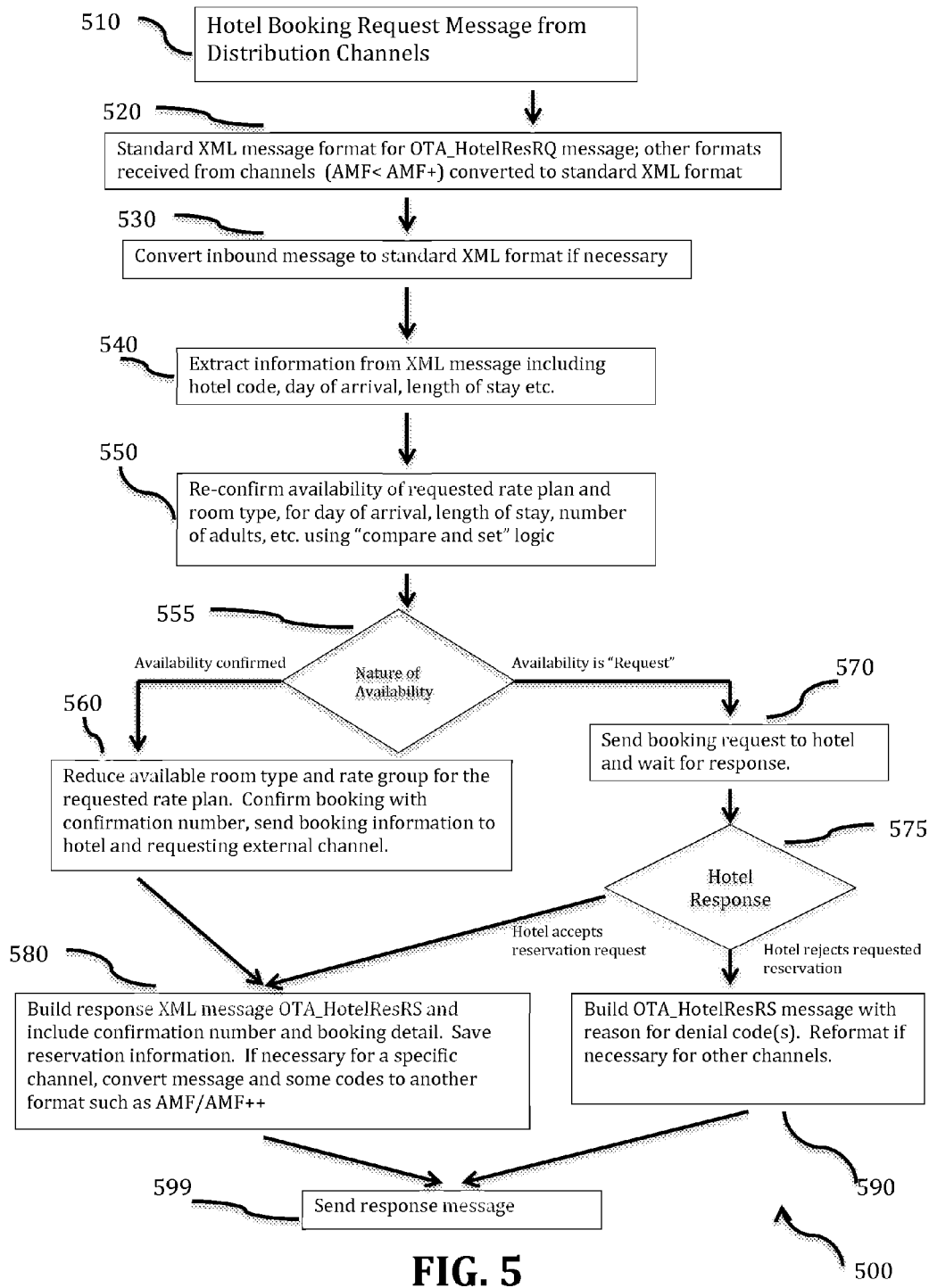
FIG. 5 is a flowchart illustrating a logical flow of hotel booking requests to HCRS, or directly to the Availability Engine, from external channels, according to an embodiment of the invention.

In FIG. 5, the process flow for booking request messages is described, and is represented generally by reference numeral 500. The processing steps set forth in FIG. 5 are carried out by the Availability Engine. In particular, the processing steps in FIG. 5 pertaining to the generation of the response are performed by the response processor of the Availability Engine. To simplify the explanation, "External Channels" in general means not only OTA/GDS booking messages but also those that may come from a proprietary web site or agents in an internal reservation call center. The latter transactions may be processed by existing modules within an HCRS and passed to the Availability Engine as a transaction, in XML or some other defined form. Booking messages may also be passed directly to the PMS for processing, as indicated by internal information or as a general process within the chain. Booking messages may also be a direct request based on outside information, i.e. not in response to an area or hotel availability request. Examples of this type of booking request would be from channels that maintain ARI such as Expedia, or wholesale sources that have room allocations.

Box 510 indicates that a Hotel Booking Request Message is inbound from a distribution channel. Standard transaction processing methods would be employed to manage simultaneous requests from multiple sources, to enable restart or transaction retry, and to log both inbound and outbound transactions to ensure ACID properties are maintained.

Box 520 of FIG. 5 describes the standard form of XML message expected from external channels for booking messages, the OTA_HotelResRQ message containing all required information to initiate the booking process.

In step/box 530 of FIG. 5, inbound booking requests are translated from non-OTA XML formats if necessary, while preserving format type for later use in step 580 or 590 to convert OTA XML format back to a non-standard format such as AMF or AMF+. An example message in brief form is shown in the figure, with some information elided for brevity.

In step 540, key values are extracted from the inbound message and organized into standard internal form. Booking message information includes detailed customer information, address, credit card etc. in addition to rate type, rate code if specified, room type code if specified, hotel code, dates of arrival and departure, number of rooms, adults and children, frequent guest ID, etc. The booking message is very long so an example is not explicitly shown in the figure.

Next, in step 550 of FIG. 5, a logical test is used to determine if the booking request is for a product (room type and rate plan) that is still indicated as available within the Availability Engine information, or whether the booking request is for a product not shown as available in the Availability Engine, in which case the booking request should be sent to the PMS for processing and acceptance or rejection.

In step 555, the nature if the availability is determined. FIG. 5 illustrates the decision paths if the requested booking is available (i.e., "Availability confirmed") or is "Request" status indicating that the PMS must be queried for availability.

When the availability is confirmed, in step 560, the Availability Engine reduces the availability counts for the rate plan and room type in the booking request, i.e. the Availability Engine is authorized to accept the booking and issue a confirmation on behalf of the PMS. The booking information and confirmation number would be sent to the PMS and returned to the requesting channel.

In the event that a booking request is for a product that is not shown as available in the Availability Engine, in step 570, the booking request is sent to the PMS to determine if the hotel will accept the booking. Examples of booking requests of this type would be for room types only available on request such as connecting rooms, rate plans that are only available through certain distribution channels, etc. Some hotels, and some chains, could select to have all booking request messages processed by the PMS since their volume is small relative to the volume of availability requests. The typical volume of bookings for a hotel with 500 rooms is roughly 300 per day, certainly manageable by modern PMS systems. This would be the preferred approach to eliminate redundant processing within a HCRS, i.e. duplicating the booking management process in the PMS and HCRS.

In step 575, the nature of the hotel response is determined. FIG. 5 shows the paths taken depending on the decision of the hotel PMS, either accepting the booking and sending transferring control to the confirmation response process step 580 or sending a rejection message as in step 590.

If the hotel accepts the reservation request, in step 580, the response message OTA_Hotel_ResRS is constructed with the confirmation number, repeating the requesting information. The message is assumed to be in OTA standard XML format, but could alternatively be formatted as required by the external source, which might also include extra information as agreed between the source and the hotel chain or property. Booking response messages are relatively long so no particular example is shown in the figure. The additional information contained includes cancellation requirements, deposits if required, and detailed information on taxes and any special fees.

Conversely, if the reservation request is not accepted by the hotel, in step 590, the response is constructed, including a denial code as defined by the OTA standard or possibly as agreed with the distribution channel.

Finally, in step 599, the response message is sent to the requestor, and the response message is logged if required.

3. Detailed Design—Data Formats and Interpretations

Hotel Information consists of static and information that may vary for each day. Static information includes room types and rate groups used by the PMS to manage availability, and the room type mapping of PMS room types to travel agent standard room type (i.e. if a travel agent availability request uses one of the standard room types such as King or DDBL, what room type should be used as a match by the HCRS).

Hotel Information that may change for each day includes; availability by room type for each day of arrival; availability by rate group for each day of arrival; and rate plans within rate group by day of arrival, with rate plan details—restrictions, basic rate, room type premiums, additional charges, etc.

Exemplary messages sent by a PMS to HCRS include room type availability messages and rate group availability. For room type availability, message content can be for single room type or multiples. The message could consist of a key and content, for example:
 Key—[date] [hotel code],
 Specific content—{'ROOM': 10, 'KING': 3, 'DDBL': 3, 'QUEEN': 1, . . . }.
Variations of this message could include setting the available number of rooms to a status code of 'OPEN' if there are an ample number of rooms, 'REQUEST' if there are few of a type or if a room type is only available on request, or '0' if the room type is not available. If a room type is not specified for a day of arrival it is assumed not to be available for sale.

Rate group availability messages may define either single rate group or multiples. For example, the message content would include a key and content describing the rate group availability, as:
 Key—[date] [hotel code],
 Specific content—{'RACK': 10,'PACKAGE': 2, 'VACATION': 3, 'CONTRACT': 5, 'VOLUME': 3, 'DISCOUNT': 3, 'CONVENTION': 3, 'SPECIAL': 3}.
Variations are the same as for room type—OPEN, REQUEST etc. Different hotels may use different rate groups, or place special rates such as negotiated corporate rates in different rate groups with no loss of generality, and without requiring modifications or special handling by the HCRS.

Specific information defining rate plans within a rate group follow the same general structure of key and content, for example the key would specify which rate plan is to be defined, as: Key—[date] [hotel code] [rate group] [rate plan name], Specific content could include any number of rate modifiers that specify the basic rate and additions or subtractions for various request information such as number of rooms or number of adults. This information could also be specified as a percentage addition or discount. A few examples suffice to show the general approach: {'RATE': [[1, 15], [200, 199, 198, 197, 196, 195, . . . ]]} defines the rate for each length of stay, as well as minimum and maximum lengths of stay for this rate plan. {'ADULTS': [[1, 4], [0, 20, 30, 40]]} indicates that each adult after the first would add to the rate. {'ROOMS': [[1, 4], ['%', 0.0, −0.2, −0.15, −0.1]]} defines the maximum number of rooms for which the rate plan is valid and it further lists the percentage discounts for the purchase of multiple rooms.

In these examples the basic rate is determined from the RATE detail, and various modifiers can affect the overall rate based on the room type requested or offered, the number of adults, etc. For example, the ROOMS modifier specifies that this rate plan is only valid for up to 4 rooms. It further indicates that the cost of the second room is to be discounted by 20% because the entry of "−0.20" is less than or equal to 1.0 and taken as a discount (if negative) or premium (if positive). Various other data processing techniques are available to distinguish a percent from an absolute currency amount, but this approach is straightforward and will work for the vast majority of hotel chains. The modifiers work the same way for currency amounts expressed in units, such as the charge for extra adults in a room—a positive value is added to the base rate, a negative one is subtracted.

Many more rate plan modifiers can be defined, as long as there are variables that can be calculated or specified that will determine the appropriate value. These could include request codes sometimes used by travel agents, or additional charges for optional services such as parking, Internet access, etc.

Also, the RATE modifier may refer or point to another rate plan, or master plan, making it a dependent rate. In this case, the key of the higher level rate plan would be given instead of a base amount. Another possible embodiment would allow for multiple levels of dependent rates.

Another embodiment would allow for and/or require that rate modifiers from the higher level rate plan would be used if not specified in the dependent rate plan, etc. It should be readily apparent to one skilled in the art that is not necessary to specify values above a certain level if they are constant, i.e. RATE could be specified as 'RATE': [[1, 15] [200, 195, 190]] and the system would use the last entry for all lengths of stay of 3 or more days (i.e., $190.00 rate).

Similarly, certain restriction methods, including CTA (closed to arrival), MLS (minimum length of stay) and others are fully supported in this structure. For example, if the rate modifier were given as 'RATE': [[3,5], [200,195, 190]] this would prevent the rate plan from being available for a length of stay less than three. If a rate plan were closed to arrival, the rate plan would not be defined for that day, etc.

It also should be readily apparent that this approach fully supports full pattern length of stay pricing (term of art) using the average rate for the length of stay, but can also be interpreted as daily rates for the length of stay. In the example above for RATE, the value is assumed to be the average rate per day. It could equally be interpreted as the rate for each day within the stay with only a minor modification, or by using an indicator such as RATETYPE within the rate plan definition.

Some chains support the idea of "length-of-stay sell through", meaning that for certain LOS values, availability of room type or rate group need not be checked. This could be defined as a separate rate modifier.

Another embodiment of the invention could use a separate rate group to manage availability of long stay rate plans. Availability for this rate group and room types within it would show availability as OPEN, providing the requisite functionality.

Another embodiment would allow for rate plans to be exclusive to a frequent guest program, or to specific tier with the program (e.g. Gold, Silver, etc.). This would allow different charges for room types and/or room type upgrades.

Another embodiment would allow for the rate to be modified based on the frequent guest program tier, either discounted, or making changing the cost of some additional charges.

Those skilled in the art can readily see how external factors can also be included in the rate calculation and/or restrictions, ranging from giving preferential rates for certain channels such as the chain web site, or reducing certain charges or premiums based on guest history such as room upgrades for guests with multiple stays in a time period, etc.

4. Representative Technical Implementation

Figure 6:
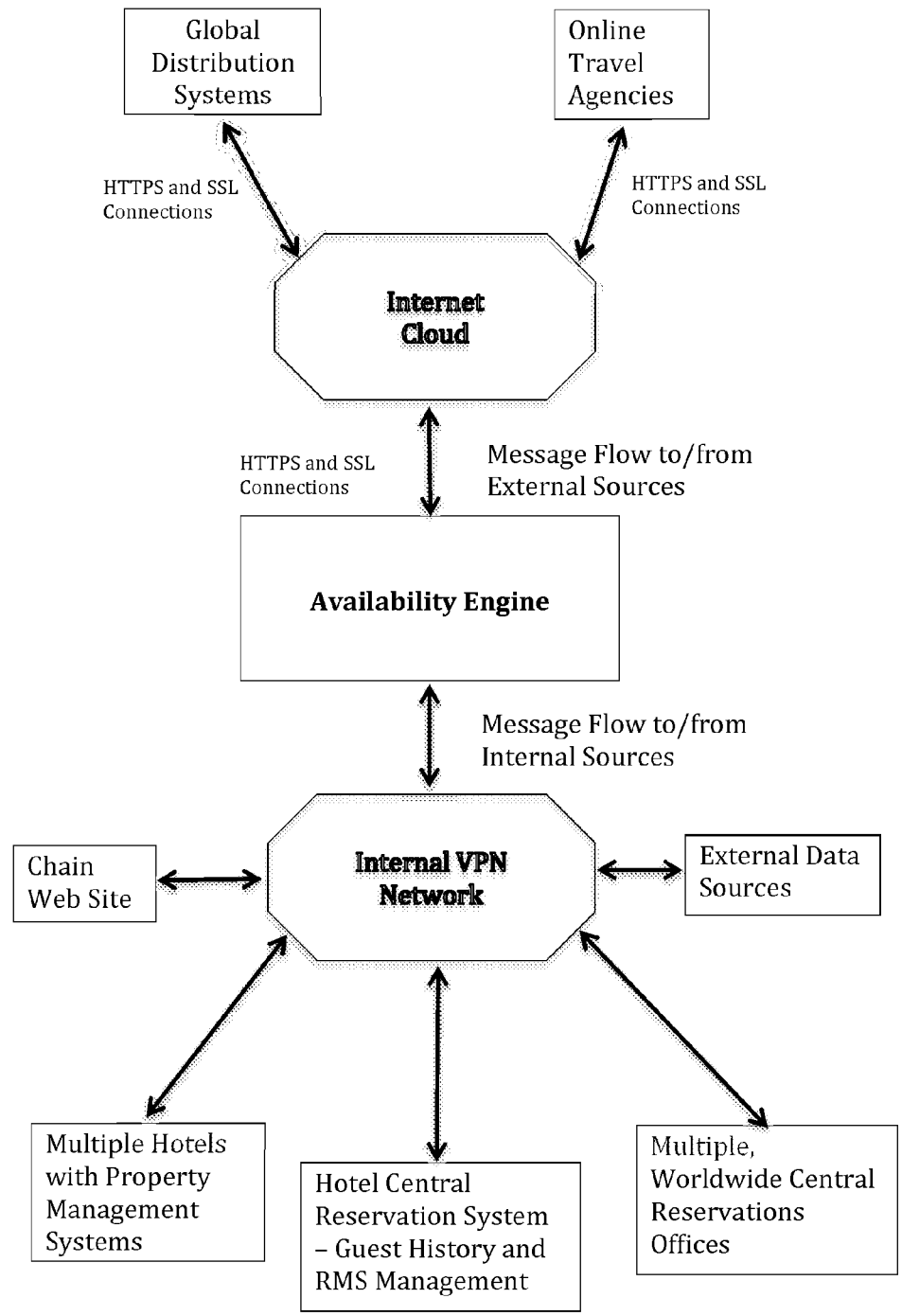
FIG. 6 is a block diagram illustrating an exemplary computer system architecture of the system, according to an embodiment of the invention.

One possible embodiment of the invention would be as a web-based service, as shown in a representative network diagram in FIG. 6. In the diagram, the Availability Engine could be implemented as an Amazon Web Services or Google App Engine web service in a representative programming language such as Java or Python. The components of the web service would include initialization routines to create the initial implementation and starting data values, update routines to accept updated ARI and property information from PMSs (see FIG. 2), availability services for area and hotel availability (see FIGS. 3 and 4), and booking services (see FIG. 5).

The implementation of the availability services would include specific modules to perform the following sub-services: transaction management and inbound message logging, XML decoding, data conversion to internal form, availability checking, rate calculation, rate summarization, detailed rate information, XML encoding, and transaction management and logging of outbound messages. (see FIG. 7 for a block diagram of these modules).

It is to be expected that someone skilled in the art of programming would be able to construct a working version of the invention based on the description and detail presented herein.

5. Additional Uses in Rental Car or Airline Operations

The basic construct of the invention is representing instantaneous availability of travel products (hotel rooms, cars, airline seats) in an Availability Engine, based on updates of product and rate information from distributed systems that operate or manage a local service. Similar to that described above for hotels, a Rental Car company could send the industry equivalent ARI status information to a RCRS indicating cars available by car class, rate plans for unqualified rates and qualified rates for corporate or frequent renters.

Like HCRSs, rental car reservation systems have a very high rate of request for availability and rates to confirmed bookings. The station management systems in use today (whether located at rental car locations or provided as a web-based service) could update rates and availability in a Availability Engine, using the same design principles described in this invention.

Similarly, airline systems that manage airport and gate controls could use the same principles to construct an Availability Engine with seats and pricing by segment. Since the majority of flights for most airlines are single segment (one airport to another on the same aircraft) the availability of seats and rates can be provided through an Availability Engine that obtains seats and rates from individual airport systems, whether operating locally or as a module of an airline CRS. Clearly, however, multi-segment or itinerary bookings would have to be handled in a different fashion by the CRS, and often in cooperation with other CRSs. This could also lead to a complete redesign of airline segment management and itineraries.

Both car rental and airline CRSs could be redesigned to use the Availability Engine concept, with similar levels of cost reduction and performance improvements that a hotel company would experience by using the Availability Engine with existing PMSs and HCRSs.

Advantageously, unlike the conventional HCRS implementations, the aforedescribed Availability Engine uses memory-based storage of information, such as Memcache in Google App Engine or Memcached application available in multiple open source forms (i.e., a general-purpose distributed memory caching system). The distributed memory caching system caches data and objects in random access memory (RAM) to reduce the number of times an external data source must be read. In the Memcached application, a giant hash table is distributed across multiple computing devices (e.g., servers). When the has table is full, subsequent inserts into the table cause older data to be purged in least recently used (LRU) order. As such, these products maintain the most recently used information in memory vs. a database or data store, resulting in access times 100 to 1000 times faster than using conventional RDBMS database or data access methods. Servers available today, especially in a cluster, can include multiple terabytes of memory for direct memory access, enough to maintain more than 90% of information required to service area and hotel availability requests directly from memory vs. a database for 1000s of hotels and multiple years of availability.

Also, advantageously, unlike the conventional HCRS implementations, the aforedescribed Availability Engine employs transitory room types and rate plans, which are used for the next booking and possibly updated after each booking with new or different availability, rates or room types. Currrent HCRSs are designed to duplicate in most or all respects the information in each PMS, with obvious technical problems to be resolved in keeping two databases in synchrony. The Availability Engine allows hotels to define and make available a room type with specific attributes, or a rate plan with special rates or features, good only until the next booking or until the PMS closes availability for these transitory room types or rates.

Also, advantageously, the Availability Engine manages only the room type availability and rate category availability, since the Availability Engine is only concerned with availability for the next booking, and the not total inventory of all room types and rate groups. Thus, in one or more embodiments, the Availability Engine does not keep track of the total or entire inventory for room types and rate groups. Rather, the Availability Engine employs an abbreviated coded message exchange while under a predetermined working inventory threshold, which is different from the actual hotel room count.

Also, advantageously and unlike the organization of a typical HCRS, the Availability Engine can be an adjunct or independent process, or a web service operating independently of the HCRS, servicing availability requests. It offers a compact and efficient structure for rate plan information accommodating multiple dependent rates and rate modifiers.

Also, advantageously and unlike current HCRSs that have a fixed booking horizon, usually one year, the Availability Engine has an unlimited horizon for availability, with distant and infrequently requested dates available from a data-store, offering essentially unlimited future availability management.

Although the invention has been shown and described with respect to a certain embodiment or embodiments, it is apparent that this invention can be embodied in many different forms and that many other modifications and variations are possible without departing from the spirit and scope of this invention.

Moreover, while exemplary embodiments have been described herein, one of ordinary skill in the art will readily appreciate that the exemplary embodiments set forth above are merely illustrative in nature and should not be construed as to limit the claims in any manner. Rather, the scope of the invention is defined only by the appended claims and their equivalents, and not, by the preceding description.

The invention claimed is:

1. A computer-based system for responding to requests for hotel room and rate availability, comprising:
a central reservation computing system including a revenue management module configured and arranged to update hotel room rate information and a guest history module, said central reservation computing system operatively coupled to a plurality of hotel property management computing systems, said plurality of hotel property management computing systems configured to manage availability information for respective properties, one or more of said plurality of hotel property management computing systems being configured to manage said availability information for individual ones of said respective properties, said central reservation computing system and said plurality of hotel property management computing systems being operated by a provider of hotel services that determines and sets hotel room rates, said availability information including availability of room inventory and availability of rates, a first of said plurality of hotel property management computing systems configured and arranged to communicate a first set of said availability information as needed or as requested, a second of said plurality of hotel property management computing systems configured and arranged to communicate a second set of said availability information as needed or as requested; and
an availability engine operatively coupled to said central reservation computing system and to said plurality of hotel property management computing systems, said availability engine configured and arranged to respond to requests from internal and external sources for hotel room and rate availability instead of said central reservation computing system handling said requests from said internal and external sources, wherein said internal sources include an internal reservation call center and a proprietary website, and wherein said external sources include global distribution systems and online travel agencies that are consumers of said availability information furnished by said provider of hotel services, said availability engine further configured and arranged to receive updates to said rate information from said revenue management module of said central reservation computing system and to utilize said updates to said rate information when responding to said requests from said internal and external sources, said availability engine additionally configured and arranged to receive and store said availability information from said plurality of hotel property management computing systems in a form native to said plurality of hotel property management computing systems without requiring standardization by said availability engine as to room type and rate plan when said availability information is received and stored, said availability information being stored using memory-based storage thereby enhancing a processing speed of responses to said requests by said computer-based system, said availability engine including:
a search processor, including at least one hardware component, configured to initiate, in response to a request, a search of a compilation of said availability information compiled from at least one of said plurality of hotel property management computing systems; and
a response processor, including at least one hardware component, configured to generate a response to said request to search said compilation of said availability information, wherein said response includes sufficient information to provide a full and accurate price for said request, and wherein said response includes equivalent, substantive hotel room inventory and rate information as a property direct response that would have been made by one or more of said plurality of hotel property management computing systems directly, said response comprising said hotel room inventory and rate information from said one or more of plurality of hotel property management computing systems in a native form of said one or more of plurality of hotel property management computing systems without standardization by said availability engine as to room type and rate plan when said availability information is received and stored;
wherein said availability engine is further configured and arranged to determine a nature of availability of one or more hotel rooms requested during a reservation request from said external sources based upon each of the following two status classifications: (i) availability confirmed status such that said availability engine is capable of being confirmed by said availability engine without querying one or more of said plurality of hotel property management computing systems, and (ii) availability request status such that said one or more of said plurality of hotel property management computing systems must be queried directly for said availability to be confirmed;

wherein, when said nature of availability is availability confirmed status, said availability engine is further configured and arranged to process said reservation request from said external sources based on said compilation of said availability information, to convey accepted reservations to respective ones of said plurality of hotel property management computing systems, and to send confirmation messages to said external sources; and wherein, when said nature of availability is availability request status, said availability engine is further configured and arranged to convey said reservation request from said external sources directly to a respective one of said plurality of hotel property management computing systems, to receive a hotel-generated confirmation message from said respective one of said plurality of hotel property management computing systems, and to send said hotel-generated confirmation message to said external sources.

2. The computer-based system according to claim 1, wherein one or more of said plurality of hotel property management computing systems is configured to send said availability information to said availability engine on demand or as required by changes in said availability information of the respective property management computing system resulting from modifications made thereto by property management personnel or staff, or as required by changes in availability resulting from bookings received from multiple sources.

3. The computer-based system according to claim 1, wherein one or more of said plurality of hotel property management computing systems is configured to specify and control room types that are unique to a specific property.

4. The computer-based system according to claim 1, wherein one or more of said plurality of hotel property management computing systems is configured to provide said availability information for any number of future days to said availability engine, each of said plurality of hotel property management computing systems being configured to provide a minimum number of future days consistent with agreements with a hotel central reservation system (HCRS) provider or chain manager.

5. The computer-based system according to claim 1, wherein one or more of said plurality of hotel property management computing systems is configured to provide inventory availability information in a standard message format to said availability engine, using agreed upon standards, which include a number of rooms of each type representing a maximum quantity that are able to be sold before requesting or receiving updated information on room type inventory and availability.

6. The computer-based system according to claim 1, wherein one or more of said plurality of hotel property management computing systems is configured to provide rate availability information in a form of rate groups or categories with a number of rooms that can be sold using any rate plans defined for each of the rate groups or products available for sale by said availability engine for each day, before said availability engine receives or must request updated information on rate group or category inventory and availability.

7. The computer-based system according to claim 1, wherein one or more of said plurality of hotel property management computing systems is configured to provide detailed information for each day for each room type and for each group of rate plans to said availability engine, said detailed information controlling, for each said rate plan, the minimum and maximum numbers of guests, length of stay, and other controlling parameters as agreed between said central reservation computing system, the chain and at least one of said plurality of hotel property management computing systems.

8. The computer-based system according to claim 1, wherein one or more of said plurality of hotel property management computing systems is configured to provide detailed information for each day for each room type and for each rate plan within a rate category to said availability engine, said detailed information controlling additional charges, if any, for each room type, guest or guest type, number of rooms requested and additional charges as agreed between at least one of said plurality of hotel property management computing systems and said central reservation computing system, which include meal plans and special excursions.

9. A computer-based system for responding to requests for rental car availability and rate information, comprising:

a central reservation computing system including a revenue management module configured and arranged to update rate information, said central reservation computing system operatively coupled to a plurality of rental location computing systems, said plurality of rental location computing systems configured to manage availability information for respective rental car locations, one or more of said plurality of rental location computing systems being configured to manage said availability information for individual ones of said respective rental car locations, said central reservation computing system and said plurality of rental location computing systems being operated by a provider of rental car services that determines and sets rental car rates, said availability information including availability of car inventory and availability of rates, a first of said plurality of rental location computing systems configured and arranged to communicate a first set of said availability information as needed or as requested, a second of said plurality of rental location computing systems configured and arranged to communicate a second set of said availability information as needed or as requested; and an availability engine operatively coupled to said central reservation computing system and to said plurality of rental location computing systems, said availability engine configured and arranged to respond to requests from internal and external sources for rental car and rate availability instead of said central reservation computing system handling said requests from said internal and external sources, wherein said internal sources include an internal reservation call center and a proprietary website, and wherein said external sources include global distribution systems and online travel agencies that are consumers of said availability information furnished by said provider of rental car services, said availability engine further configured and arranged to receive updates to said rate information from said revenue management module of said central reservation computing system and to utilize said updates to said rate information when responding to said requests from said internal and external sources, said availability engine additionally configured and arranged to receive and store said availability information from said plurality of rental location computing systems in a form native to said plurality of rental location computing systems without requiring standardization by said availability engine as to car type and rate plan when said availability information is received and stored, said availability information being stored using memory-based storage thereby enhancing a processing speed of responses to said requests by said computer-based system, said availability engine including:

a search processor, including at least one hardware component, configured to initiate, in response to a request, a search of a compilation of said availability information compiled from at least one of said plurality of rental location computing systems; and a response processor, including at least one hardware component, configured to generate a response to said request to search said compilation of said availability information, wherein said response includes sufficient information to provide a full and accurate price for said request, and wherein said response includes equivalent, substantive rental car inventory and rate information as a property direct response that would have been made by one or more of said plurality of rental location computing systems directly, said response comprising said rental car inventory and rate information from said one or more of plurality of rental location computing systems in a native form of said one or more of plurality of rental location computing systems without standardization by said availability engine as to car type and rate plan when said availability information is received and stored;

wherein said availability engine does not utilize a relational database management system configured to store and manage said compilation of said availability information.

10. The computer-based system according to claim 9, wherein one or more of said plurality of rental location computing systems is configured to send said availability information to said availability engine on demand or as required by changes in said availability information of the respective rental location computing system resulting from modifications made thereto by rental car location staff.

11. The computer-based system according to claim 9, wherein one or more of said plurality of rental location computing systems is configured to specify and control car types that are unique to the rental car location.

12. The computer-based system according to claim 9, wherein one or more of said plurality of rental location computing systems is configured to provide said availability information for any number of future days to said availability engine, each of said plurality of rental location computing systems being configured to provide a minimum number of future days consistent with agreements with a rental car central reservation system provider or chain manager.

13. The computer-based system according to claim 9, wherein one or more of said plurality of rental location computing systems is configured to provide car inventory availability information in a standard message format to said availability engine, using agreed upon standards, which include a number of cars of each type representing a maximum quantity that are able to be sold before requesting or receiving updated information on car type inventory and availability.

14. The computer-based system according to claim 9, wherein one or more of said plurality of rental location computing systems is configured to provide car rate availability information in a form of rate groups or categories with a number of cars that can be sold using any rate plans defined for each of the rate groups, or products available for sale by said availability engine for each day, before said availability engine receives or must request updated information on rate group or category inventory and availability.

15. A computer-based system for responding to requests for airline seat availability and rate information, comprising:

a central reservation computing system including a revenue management module configured and arranged to update rate information, said central reservation computing system operatively coupled to a plurality of airline computing systems, said plurality of airline computing systems configured to manage availability information for respective airports, one or more of said plurality of airline computing systems being configured to manage said availability information for individual ones of said respective airports, said central reservation computing system and said plurality of airline computing systems being operated by a provider of airline services that determines and sets airline fares for travel between specified airports, said availability information including availability of airline seat inventory and availability of rates to a plurality of destinations, a first of said plurality of airline computing systems configured and arranged to communicate a first set of said availability information as needed or as requested, a second of said plurality of airline computing systems configured and arranged to communicate a second set of said availability information as needed or as requested; and an availability engine operatively coupled to said central reservation computing system and to said plurality of airline computing systems, said availability engine configured and arranged to respond to requests from internal and external sources for airline seat and rate availability instead of said central reservation computing system handling said requests from said internal and external sources, wherein said internal sources include an internal reservation call center and a proprietary website, and wherein said external sources include global distribution systems and online travel agencies that are consumers of said availability information furnished by said provider of airline services, said availability engine further configured and arranged to receive updates to said rate information from said revenue management module of said central reservation computing system and to utilize said updates to said rate information when responding to said requests from said internal and external sources, said availability engine additionally configured and arranged to receive and store said availability information from said plurality of airline computing systems in a form native to said plurality of airline computing systems without requiring standardization by said availability engine as to airline seat and rate plan when said availability information is received and stored, said availability information being stored using memory-based storage thereby enhancing a processing speed of responses to said requests by said computer-based system, said availability engine including:

a search processor, including at least one hardware component, configured to initiate, in response to a request, a search of a compilation of said availability information compiled from at least one of said plurality of airline computing systems; and a response processor, including at least one hardware component, configured to generate a response to said request to search said compilation of said availability information, wherein said response includes sufficient information to provide a full and accurate price for said request, and wherein said response includes equivalent, substantive airline seat inventory and rate information as a direct response that would have been made by one or more of said plurality of airline computing systems directly, said response comprising said airline seat inventory and rate information from said one or more of plurality of airline computing systems in a native form of said one or more of plurality of airline computing systems without standardization by said availability engine as to airline seat and rate plan when said availability information is received and stored;

wherein said availability engine does not utilize a relational database management system configured to store and manage said compilation of said availability information.

16. The computer-based system according to claim 15, wherein one or more of said plurality of airline computing systems is configured to send said availability information on demand to said availability engine or as required by changes in aid said availability information of the respective airline computing system resulting from modifications made thereto by airline staff.

17. The computer-based system according to claim 15, wherein one or more of said plurality of airline computing systems is configured to specify and control seat quantities and types that are unique to aircraft departing from its respective airport location.

18. The computer-based system according to claim 15, wherein one or more of said plurality of airline computing systems is configured to provide said availability information for any number of future flights to said availability engine, each of said plurality of airline computing systems being configured to provide a minimum number of future flights consistent with agreements with an airline central reservation system provider or airline management.

19. The computer-based system according to claim 15, wherein one or more of said plurality of airline computing systems is configured to provide seat inventory availability information in a standard message format to said availability engine, using agreed upon standards, which include a number of seats on each flight representing a maximum quantity that are able to be sold before requesting or receiving updated information on seat inventory and availability.

20. The computer-based system according to claim 15, wherein one or more of said plurality of airline computing systems is configured to provide rate availability information in a form of rate groups or categories with a number of seats that can be sold using any rate plans defined for each of the rate groups, or products available for sale by said availability engine for each flight, before said availability engine receives or must request updated information on rate group or category inventory and availability.

21. The computer-based system according to claim 1, wherein said availability engine is configured and arranged to be implemented in any one or several of the following forms: (i) an appliance that is operatively coupled to said central reservation computing system, (ii) a web-based service configured to operate as an interface to said external sources and configured to receive updated information directly from one or more of said plurality of hotel property management computing systems; and (iii) a standalone service routine integrated into existing code of said central reservation computing system.

22. The computer-based system according to claim 1, wherein said availability engine has no fixed time duration limits as to the number of days of said availability information that is able to be provided by said plurality of hotel property management computing systems and stored by said availability engine, said availability engine being configured and arranged to provide said availability information without said time duration limits by virtue of storing said availability information in said memory-based storage.

23. The computer-based system according to claim 1, wherein said availability engine does not utilize a relational database management system configured to store and manage said compilation of said availability information.

24. The computer-based system according to claim 1, wherein said compilation of said availability information searched by said search processor of said availability engine comprises availability of hotel room inventory, and wherein said availability engine is further configured and arranged to determine said availability of hotel room inventory based upon a next booking of a particular hotel room type at a particular hotel property rather than a total inventory of said hotel room type at said particular hotel property, said availability engine being configured and arranged to determine said availability of said hotel room inventory based upon said next booking rather than said total inventory by creating multiple room type listings with varying room rates for a single hotel room in accordance with different attributes of said single hotel room, said availability engine being further configured and arranged to close all of said multiple room type listings for said single hotel room whenever any of said multiple room type listings is confirmed in a reservation.

25. The computer-based system according to claim 1, wherein said availability engine further comprises a rate calculation module, said rate calculation module configured and arranged to calculate a total rate for a particular room type and rate plan based on parameters in said request and based on rate plan modifiers, said rate plan modifiers including arrival date, departure date, room type premiums, number of adults, and number of rooms.

26. The computer-based system according to claim 25, wherein said rate calculation module of said availability engine is configured and arranged to calculate total rates for a plurality of different room types using a plurality of different rate plans, wherein an availability state of one or more of said rate plans used by said rate calculation module is configured to be modified by one or more of said plurality of hotel property management computing systems based on whether or not a predetermined condition is satisfied.

* * * * *